US010009821B2

(12) United States Patent
Futaki

(10) Patent No.: US 10,009,821 B2
(45) Date of Patent: Jun. 26, 2018

(54) RADIO COMMUNICATION SYSTEM, RADIO TERMINAL, RADIO STATION, AND COMMUNICATION CONTROL METHOD

(71) Applicant: NEC Corporation, Tokyo (JP)

(72) Inventor: Hisashi Futaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days. days.

(21) Appl. No.: 14/412,380

(22) PCT Filed: Jul. 4, 2013

(86) PCT No.: PCT/JP2013/068391
§ 371 (c)(1),
(2) Date: Dec. 31, 2014

(87) PCT Pub. No.: WO2014/007337
PCT Pub. Date: Jan. 9, 2014

(65) Prior Publication Data
US 2015/0189571 A1 Jul. 2, 2015

(30) Foreign Application Priority Data
Jul. 5, 2012 (JP) ................ 2012-151911

(51) Int. Cl.
H04W 36/34 (2009.01)
H04W 24/10 (2009.01)
(Continued)

(52) U.S. Cl.
CPC .......... H04W 36/34 (2013.01); H04W 24/10 (2013.01); H04W 36/0083 (2013.01); H04W 36/08 (2013.01); H04W 74/002 (2013.01)

(58) Field of Classification Search
None
See application file for complete search history.

(56) References Cited

U.S. PATENT DOCUMENTS

2011/0244874 A1 10/2011 Fodor et al.
2011/0281615 A1* 11/2011 Yamada ............ H04W 36/0094
455/524
(Continued)

FOREIGN PATENT DOCUMENTS

EP 1677564 A1 7/2006
EP 2528394 11/2012
(Continued)

OTHER PUBLICATIONS

International Search Report corresponding to PCT/JP2013/068391, dated Sep. 17, 2013, 2 pages.
(Continued)

Primary Examiner — Mohammad S Adhami
(74) Attorney, Agent, or Firm — Wilmer Cutler Pickering Hale and Dorr LLP

(57) ABSTRACT

The present invention is a radio communication system in which a radio station and a radio terminal communicate with each other. The radio communication system has a control means with which at least one of the radio stations controls a plurality of types of cells by using one radio access technology, a recognition means with which the radio terminal recognizes the types of the cells, and a measurement report means with which the radio terminal performs a report of measurement results based on measurement report criteria according to the types of the cells.

16 Claims, 14 Drawing Sheets

(51) Int. Cl.
*H04W 36/00* (2009.01)
*H04W 36/08* (2009.01)
*H04W 74/00* (2009.01)

(56) References Cited

U.S. PATENT DOCUMENTS

| | | | |
|---|---|---|---|
| 2012/0076041 A1* | 3/2012 | Jung | H04W 24/10 370/252 |
| 2012/0309385 A1 | 12/2012 | Nakamura et al. | |
| 2013/0058245 A1* | 3/2013 | Van Lieshout | H04W 36/0083 370/252 |
| 2013/0208601 A1* | 8/2013 | Cui | H04W 24/10 370/252 |
| 2013/0231115 A1* | 9/2013 | Lin | H04W 36/0083 455/436 |
| 2015/0023197 A1* | 1/2015 | Iraji | H04W 48/16 370/252 |
| 2015/0078156 A1 | 3/2015 | Fodor et al. | |

FOREIGN PATENT DOCUMENTS

| | | |
|---|---|---|
| JP | 2010-147916 | 7/2010 |
| JP | 2010-154399 | 7/2010 |
| JP | 2010-171642 | 8/2010 |
| JP | 2011-151612 | 8/2011 |
| JP | 2012-039625 | 2/2012 |
| JP | 2012-511863 A | 5/2012 |
| TW | 201233204 A | 8/2012 |
| WO | WO-2011/016195 A1 | 2/2011 |
| WO | WO2012051955 * | 10/2011 |

OTHER PUBLICATIONS

3GPP TS36.331v11.0.0 (Jun. 2012), Evolved Universal Terrestrial Radio Access (E-UTRA); Radio Resource Control (RCC); Protocol specification; (Release 11), Internet<URL> http://www.3gpp.org/ftp/Specs/html-info/36331.htm, pp. 73-93.

3GPP TSG RAN WG2 Meeting #76, R2-115666, Internet<URL>http://www.3gpp.org/ftp/tsg_ran/WG2_RL2/TSGR2_76/Docs/R2-115666.zip, San Francisco, USA, Nov. 14-28, 2011, 2 pages.

3GPP TS 36.331, version 10.5.0 (Mar. 2012), Release 10, Evolved Universal Terrestrial Radio Access (E-UTRA); Radio Resource Control (RCC); Protocol specification, Internet<URL> http://www.3gpp.org/ftp/Specs/html-info/36331.htm, (306 pages).

3GPP: "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.0.0; Jun. 1, 2012, pp. 1-302.

Extended European Search Report issued in corresponding European Application No. 13813526.4, dated Feb. 8, 2016, 11 pages.

New Postcom: "CSI-RS based RRM measurement for additional carrier type", 3GPP TSG RAN WG1 Meeting #69, R1-122096, Prague, Czech Republic, May 21-25, 2012, pp. 1-3.

Japanese Office Action issued by the Japan Patent Office for Japanese Application No. 2014-523790 dated May 17, 2017 (7 pages).

Chinese Office Action issued by The State Intellectual Property Office of the People's Republic of China for Chinese Application No. 201380042679.4 dated Aug. 11, 2017 (22 pages).

* cited by examiner

FIG. 9

```
ReportConfigEUTRA ::=          SEQUENCE {
    triggerType                    CHOICE {
        event                          SEQUENCE {
            eventId                        CHOICE {
                eventA1                        SEQUENCE {
                    a1-Threshold                   ThresholdEUTRA
                },
                eventA2                        SEQUENCE {
                    a2-Threshold                   ThresholdEUTRA
                },
                eventA3                        SEQUENCE {
                    a3-Offset                      INTEGER (-30..30),
                    a3-Offset-r1x                  INTEGER (-yy..zz)     OPTIONAL,
                    reportOnLeave                  BOOLEAN
                },
                eventA4                        SEQUENCE {
                    a4-Threshold                   ThresholdEUTRA
                },
                eventA5                        SEQUENCE {
                    a5-Threshold1                  ThresholdEUTRA,
                    a5-Threshold2                  ThresholdEUTRA
                },
                ...,
                eventA6-r10                    SEQUENCE {
                    a6-Offset-r10                  INTEGER (-30..30),
                    a6-ReportOnLeave-r10           BOOLEAN
                }
            },
            hysteresis                     Hysteresis,
            timeToTrigger                  TimeToTrigger
        },
        periodical                     SEQUENCE {
            purpose                        ENUMERATED {
                                               reportStrongestCells, reportCGI}
        }
    },
    ...
}
```

RADIO COMMUNICATION SYSTEM, RADIO TERMINAL, RADIO STATION, AND COMMUNICATION CONTROL METHOD

CROSS-REFERENCE TO RELATED APPLICATIONS

This application is a national stage application of International Application No. PCT/JP2013/068391 entitled "RADIO COMMUNICATION SYSTEM, RADIO TERMINAL, RADIO STATION, AND COMMUNICATION CONTROL METHOD," filed on Jul. 4, 2013, which claims the benefit of the priority of Japanese patent application No. 2012-151911, filed on Jul. 5, 2012, the disclosures of each of which are hereby incorporated by reference in their entirety.

TECHNICAL FIELD

The present invention relates to a radio communication system in which a radio station and a radio terminal each have a function to control a plurality of types of cells by using a specific radio access technology.

BACKGROUND ART

In an LTE (Long Term Evolution) being one standard of a radio communication system regulated by 3GPP (3rd Generation Partnership Project), a radio terminal (User Equipment: UE) selects one cell having a downlink (Downlink: DL) component carrier (hereinafter, referred to as a DL carrier) and an uplink (Uplink: UL) component carrier (hereinafter, referred to as a UL carrier) associated with the DL carrier, and performs communication with a radio base station (evolved Node B: eNB) in the cell. Further, a selection of the cell of the radio terminal (UE) basically corresponds to that of the DL carrier. In the LTE, by using the DL carrier, the radio base station (eNB) periodically transmits a reference signal (Cell specific Reference Signal: CRS), a synchronization signal (Synchronization Signal: SS), system information (System Information: SI), and the like that are mutually used by the radio terminals (UEs) within the cell. In the LTE, the above signals and information are signals and information needed when the radio terminal (UE) performs communication with the radio base station (eNB). Further, a transmission configuration (for example, a transmission period or a signal arrangement) is regulated so as to satisfy predetermined conditions.

Next, a handover procedure in the LTE is illustrated with reference to FIG. 15. In addition, in FIG. 15, the radio terminal (UE) is supposed to camp on a Cell 1 and perform communication with the radio base station (eNB) 1.

The radio base station (eNB) 1 performs instruction (MeasConfig) of a terminal measurement report (UE measurement and reporting) to the radio terminal (UE). Here, the instruction (MeasConfig) of the terminal measurement report (UE measurement and reporting) includes information (Measurement objects) indicating targets of the terminal measurement and information (Reporting configurations) indicating a method for reporting terminal measurement results. Further, the above information (Measurement objects) includes information about a radio access technology (Radio Access Technology: RAT), frequencies and cells being targets of measurement, an offset value related to received quality of signals of a measurement target cell used for a determination on report of the terminal measurement results, and the like. Further, the above information (Reporting configurations) includes information indicating whether the report of the terminal measurement results is a periodical report (periodical reporting) or a report (event triggered reporting) by an event trigger, further information indicating which event is performed in the case of the event trigger, and the like. Hereinafter, a case of the event trigger is supposed.

The radio terminal (UE) performs a measurement of the received quality of an indicated cell and a cell of an indicated frequency at the frequency or timing satisfying predetermined requirement, and determines whether the measurement results satisfy conditions of an indicated event. Further, when a situation of satisfying the conditions is continued during a predetermined period (Time To Trigger: TTT), the radio terminal (UE) reports the measurement results (Measurement report).

The radio base station (eNB) 1 determines a handover target based on a report of measurement results received from the radio terminal (UE). When the handover target is a cell (for example, a Cell 3) of a radio base station (eNB) 2, the radio base station (eNB) 1 transmits a handover request (Handover request) to the radio base station (eNB) 2; further, when the handover request can be accepted (namely, the handover of the radio terminal (UE) is permitted), the radio base station (eNB) 2 transmits a positive response for the handover request to the radio base station (eNB) 1 (Handover request acknowledgement). Then, the radio base station (eNB) 1 transmits an instruction of the handover to the radio terminal (UE) (RRC Connection Reconfiguration including MobilityControlInfo) and the radio terminal (UE) performs a handover to the Cell 3 of the radio base station (eNB) 2 based on the above instruction.

By using the above method, an appropriate handover can be realized in consideration of the received quality of signals in a serving cell (Serving cell) and neighbour cells (Neighbouring cell) (Non-patent literature 1).

On the other hand, in 3GPP, there is studied LTE-Advanced, wherein the LTE is enhanced and a function is largely extended. In the LTE, in addition to the reference signal (Cell specific Reference Signal: CRS), the radio base station (eNB) transmits also a reference signal (Demodulation RS: DM-RS) for demodulating user data, a reference signal (CSI-RS) for measuring or calculating a communication path state information (Channel State Information: CSI) of a downlink, a downlink physical control channel (Physical Downlink Control Channel: PDCCH) including scheduling information, and the like. In a study of the LTE-Advanced, it is pointed out that an overhead of the above-described signals or information other than downlink user data is large and usage of downlink radio resources is not optimized; further, for the purpose of improving downlink throughput or cell capacity, the overhead is studied to be reduced. For example, there is studied a method for reducing the number of symbols of the reference signal (CRS) for transmission per sub-frame (Subframe), reducing the number of sub-frames (Subframes) for transmitting the reference signal (CRS), or not absolutely transmitting the reference signal (CRS); further, such types of the DL carriers are called a New Carrier Type (NCT) (Non-patent literature 2). Hereinafter, separately from a conventional component carrier (Legacy Component Carrier: LCC), the component carrier of the NCT is called a New Type Component Carrier (NTCC). The NTCC is supposed to be used as a secondary component carrier (Secondary Component Carrier: SCC) (also called a secondary cell (Secondary Cell: SCell) of a carrier aggregation (Carrier Aggregation: CA) by which the radio terminal (UE) uses a plurality of component carriers at the same time and performs communication with the radio base station (eNB). Here, a component carrier (cell) by which the radio terminal (UE) establishes a connection to the radio base station (eNB) and acquires basic information such as security information is called a primary component carrier (Primary Component Carrier: PCC)/primary cell (Primary Cell: PCell); further, an additional component carrier/cell that is used together with the primary component carrier/primary cell (PCC/PCell) is called the secondary component carrier/secondary cell (SCC/SCell). It can be expected that radio resources for transmitting downlink user data are increased in the secondary component carrier/secondary cell (SCC/SCell) and downlink throughput or cell capacity is improved through an introduction of DL NTCC. Further, power saving of a radio network can be also expected. In addition, the radio base station (eNB) determines the secondary component carrier/secondary cell (SCC/SCell) used by a certain radio terminal (UE) based on the report of the terminal measurement results from the radio terminal (UE). Here, the above-described terminal measurement report for the handover is reused, or that for adding the secondary component carrier/secondary cell (SCC/SCell) is reused.

CITATION LIST

Patent Literature

Non-patent literature 1: 3GPP TS36.331v10.5.0 (Internet <URL> http://www.3gpp.org/ftp/Specs/html-info/36331.htm), section 5.5
Non-patent literature 2: 3GPP R2-115666 (Internet <URL> http://www.3gpp.org/ftp/tsg_ran/WG2_RL2/TSGR2_76/Docs/R2-115666.zip)

SUMMARY OF INVENTION

Technical Problem

Hereinafter, related technologies according to the present invention are analyzed.

With regard to an introduction of DL New Carrier Type (NCT) in the LTE-Advanced, the DL New Carrier Type (NCT) is supposed to be used as a secondary carrier (SCC)/secondary cell (SCell) during the carrier aggregation (Carrier Aggregation: CA). On the other hand, it is expected from a standpoint of an effective utilization of radio resources that a component carrier (New Type Component Carrier: NTCC) of NCT is used as a primary carrier (PCC)/primary cell (PCell). However, when the above-described NTCC is applied to the PCC/PCell, several problems as described below may arise.

First, in an initial stage in which the PCell having the NTCC as a component (hereinafter, referred to as an NTCC PCell) is introduced, a proportion of the number of the radio terminals (UEs) that are capable of using the NTCC PCell occupied in the number of all the radio terminals (UEs) in the cell is supposed to be comparatively small; further, the handover is supposed to be concentrated on the PCell having conventional component carriers (hereinafter, referred to as a Legacy PCell) as a component.

Suppose, for example, that in FIG. 15, f1 is configured to the Legacy PCell and f2 is configured to the NTCC PCell. In this case, the radio terminals (UEs) that are capable of using the NTCC PCell are distributed to each cell of f1 and f2, and the radio terminals (UEs) that are not capable of using the NTCC PCell are concentrated on the cell of f1. Therefore, depending on the rate of the radio terminals (UEs) that are capable of using the NTCC PCell, the radio terminals (UEs) are concentrated on the cells of f1. As a result, there arises a problem that processing of the handover or traffic after the handover is concentrated.

On the other hand, when a ratio of the radio terminals (UEs) that are capable of using the NTCC PCell becomes dominant and a ratio of the radio terminals (UEs) that are not capable of using the NTCC PCell decreases, the ratio of the Legacy PCell is reduced, and thereby it is expected that an effect due to the introduction of the NTCC PCell is improved.

However, when a ratio between the Legacy PCell and the NTCC PCell is not appropriately configured, the handover may be concentrated on the Legacy PCell and the same problem as the above may arise. In addition, it is predicted that the ratio of the radio terminals (UEs) that are capable of using the NTCC PCell changes based on location and time, and therefore it is considered that it is difficult to appropriately configure the ratio between the Legacy PCell and the NTCC PCell.

Further, in the meaning in which the radio terminals (UEs) are concentrated on a specific cell (for example, the Legacy Cell), there may arise a problem also in the case that the NTCC Cell is used as the SCell. Suppose, for example, that the carrier aggregation (CA) is performed, or the number of the radio terminals (UEs) that are capable of using the NTCC Cell as the SCell is small. In this case, the number of the radio terminals (UEs) that use the Legacy Cell as the SCell is more than the number of the radio terminals (UEs) that use the NTCC Cell as the SCell, and as a result, bias of a load may be generated in the Legacy Cell. The reason is that based on the measurement report from the radio terminal (UE), the radio base station (eNB) determines that the radio terminal (UE) is allowed to use which Cell as the SCell, in the same manner as in the case of the handover.

Thereupon, the present invention has been accomplished in consideration of the above-described problems, and the radio terminal (UE) is instructed to perform a necessary terminal measurement report so as to appropriately distribute target cells of the handover or secondary cells of the radio terminal (UE) in an active state (RRC_Connected).

Solution to Problem

The present invention is directed to a radio communication system in which a radio station and a radio terminal communicate with each other, including a control means with which at least one of the radio stations controls a plurality of types of cells by using one radio access technology; a recognition means with which the radio terminal recognizes a type of a cell; and a measurement report means with which the radio terminal reports measurement results based on measurement report criteria according to the type of the cell.

The present invention is directed to a radio terminal for use in a radio communication system in which a radio station controls a plurality of types of cells by using one radio access technology, including a recognition means that recognizes a type of a cell; and a measurement report means that reports measurement results based on measurement report criteria according to the type of the cell.

The present invention is directed to a radio station including a control means that controls a plurality of types of cells by using one radio access technology; and a means that transmits to a radio terminal an instruction related to a report of measurement results based on measurement report criteria according to a type of a cell.

The present invention is directed to a communication control method including causing at least one radio station to control a plurality of types of cells by using one radio access technology; causing a radio terminal to recognize a type of a cell; and causing the radio terminal to report measurement results based on measurement report criteria according to the type of the cell.

Advantageous Effects of Invention

According to the present invention, the radio terminal (UE) can be instructed to perform a terminal measurement report in consideration of a type of a cell (or a type of a carrier as a component of the cell).

BRIEF DESCRIPTION OF DRAWINGS

FIG. 9 illustrates a transmission configuration of a parameter used for measurement report criteria by the radio terminal (UE) according to the third embodiment of the present invention.

DESCRIPTION OF EMBODIMENTS

First Embodiment

In an embodiment of the present invention, a first radio communication system including a radio station (for example, a radio base station (eNB), a base station control station, and other network entity) and a radio terminal (UE) as components is used as an example, and descriptions will be made.

In a radio system in which different types of cells are mixed, a radio terminal (UE) is allowed to perform a measurement and a report of a measurement result in consideration of a type of a cell as a basic principle of the present invention.

Figure 1:
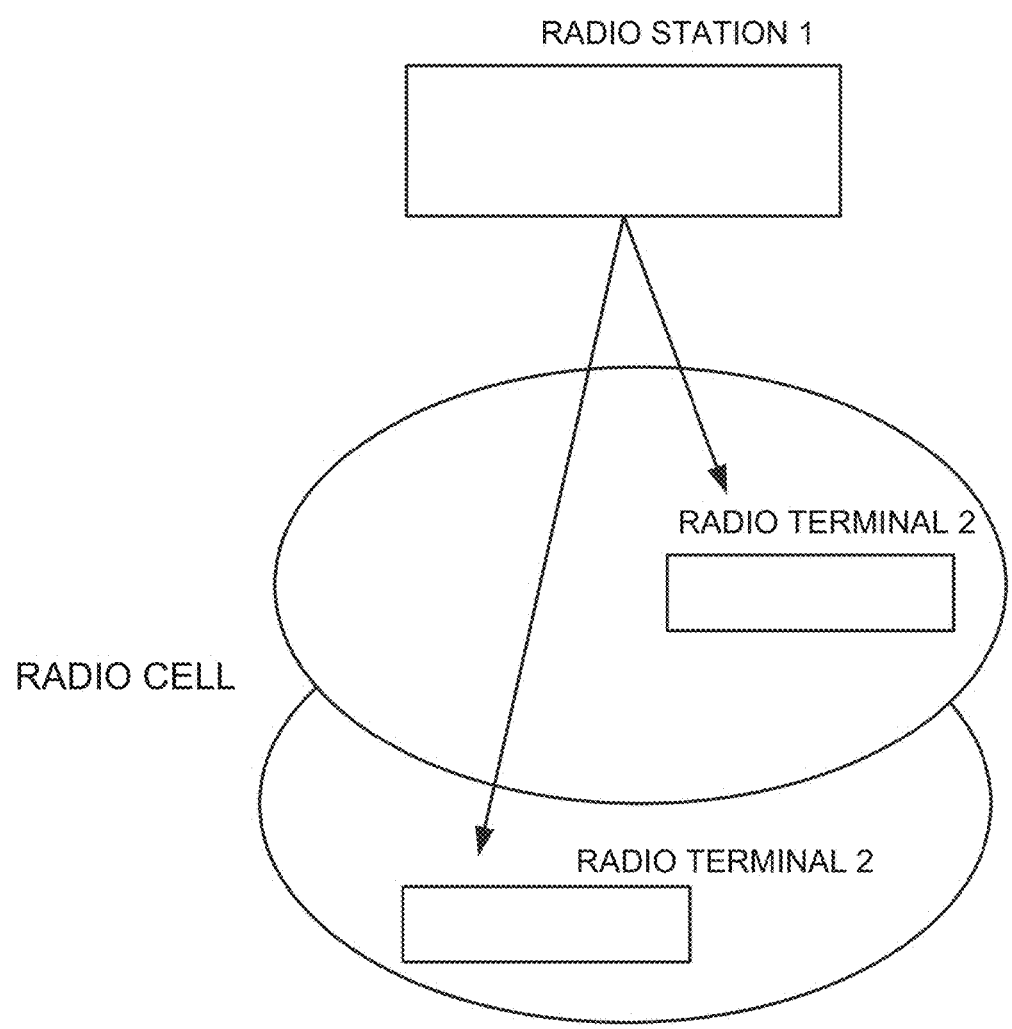
FIG. 1 is a configuration diagram illustrating a first embodiment of the present invention.

FIG. 1 is a configuration diagram illustrating a first embodiment of the present invention.

According to the first embodiment, in the first radio communication system, at least a part of radio station 1 has a control means to control a plurality of types of cells by using one radio access technology (Radio Access Technology: RAT), and at least a part of radio terminal (UE) 2 has a recognition means to recognize the type of the cells and a measurement report means to report measurement results based on measurement report criteria according to the type of the cell. In addition, as the measurement report criteria, for example, the following matters are considered.

An offset value related to the received quality
A decision threshold related to the received quality
A trigger period as a trigger of a measurement result report
A combination of the above Here, the offset value is an offset value related to the received quality of each cell used for a determination whether the report of measurement result (hereinafter, referred to as a measurement report) is performed or a determination whether the report of measurement result is aborted. Similarly, the determination threshold is a determination threshold related to the received quality of each cell used for a determination whether the measurement report is performed or a determination whether the measurement report is aborted. The trigger period is a period used for a determination whether the measurement report of an event trigger is performed, and when the measurement results satisfy a predetermined event during the trigger period, the radio terminal (UE) performs the measurement report. In addition, received signal power, received signal quality, received signal strength, and the like of a known signal (also referred to as a reference signal or a pilot signal) transmitted in each cell are supposed to be the received quality here said; however, not limited thereto.

As the types of the cells, for example, the following matters are considered.

A cell to which a conventional (legacy) radio terminal (UE) is accessible
A cell to which only a radio terminal (UE) having a specific capability (or function) is accessible
A cell to which a conventional (legacy) radio terminal (UE) is accessible only for a specific usage Here, the conventional (legacy) radio terminal (UE) is, for example, a radio terminal (UE) that has no function to perform a terminal measurement report, based on the cell selection criteria according to the type of the cell (or the carrier). On the other hand, the specific capability (or function) is, for example, a capability (or function) to perform a terminal measurement report, based on the cell selection criteria according to the type of the cell (or the carrier). It may be considered that the specific usage is, for example, to use an additional cell (or an additional carrier), in the case of performing communication with using a plurality of cells (or carriers) at the same time.

On the other hand, processing for recognizing the type of the cell by the radio terminal (UE) 2 is basically equivalent to processing for recognizing a downlink carrier in which the radio station 1 transmits (and an uplink carrier associated with the downlink carrier); therefore, it goes without saying that "the measurement report criteria according to the type of the cell" can be said to be "the measurement report criteria according to the type of the carrier" (namely, "the measurement report criteria according to the type of the cell" can be considered to be replaced by "the measurement report criteria according to the type of the carrier").

Further, from the same standpoint, it goes without saying that the type of the cell is identified by the type of the carrier as a component of the cell. The type of the carrier is classified based on a predetermined characteristic related to a transmission configuration of signals transmitted by the carrier. As the predetermined characteristic, for example, the following matters are considered.

A configuration of physical channels
A transmission configuration of the known signals transmitted by the radio station
A transmission configuration of control signals transmitted by the radio station
A transmission configuration of system information transmitted by the radio station
Contents of the system information transmitted by the radio station
A radio transmission scheme
A duplex mode As the configuration of the physical channels, it is also called a sub-frame format or a frame format of the downlink or the uplink and, for example, mapping of the physical channels, namely, an allocation method of radio resources used in transmission of each physical channel is considered.

The known signal is called a reference signal or a pilot signal. As the transmission configuration of the known signal, for example, a transmission period, a transmission band, a transmission density, a signal power density, a signal arrangement, a signal sequence, the number of transmission antennas, a type of the known signal, and the like are considered.

As the contents of the system information, information transmitted regardless of the type of the carrier, information transmitted by only a specific type of carrier, and the like are considered.

As the radio transmission scheme, for example, an OFDM, an OFDMA, an SC-FDMA, a CDMA, an FDMA, a TDMA, and the like are considered.

As the duplex mode (Duplex operation), for example, a full-duplex communication operation (Full-Duplex), a half-duplex communication operation (Half-Duplex), a frequency division duplex mode (Frequency Division Duplex: FDD), and a time division duplex mode (Time Division Duplex: TDD) are considered.

Further, the control of the cell in the control means of the radio station 1 means that the radio station 1 performs communication with the radio terminal (UE) 2, for example, by using a certain type of the carrier as a component of the cell through the downlink and/or the uplink. Further, the recognition of the type of the cell in the recognition unit 22 of the radio terminal (UE) 2 means that, for example, the radio terminal (UE) 2 knows or is aware of the type of the cell on which the radio terminal (UE) 2 camps or the type of the cell to be a target of a terminal measurement. Further, it may be also considered that the radio terminal (UE) 2 knows or is aware of the type of the downlink carrier as a component of the cell and/or the type of the uplink carrier of said cell.

As described above, according to the present invention, the radio terminal (UE) is capable of recognizing the type of the cell (or the carrier) and is capable of reporting the measurement results based on the measurement report criteria according to the type of the cell (or the carrier).

Figure 2:
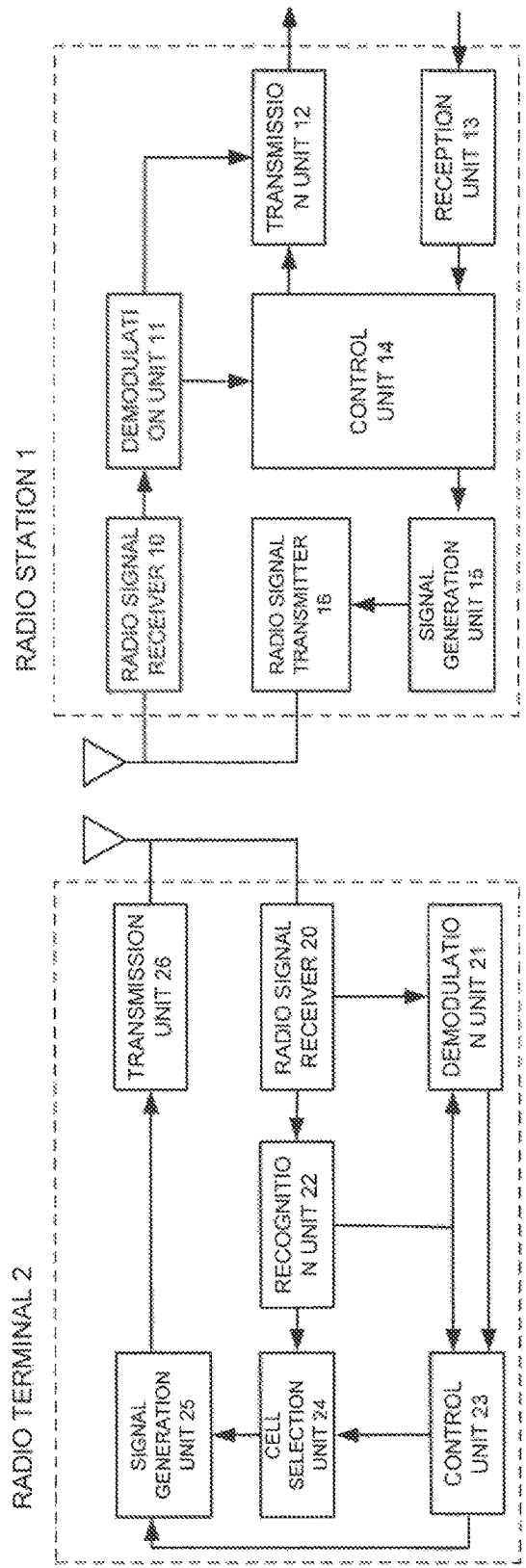
FIG. 2 is a block diagram illustrating a radio station 1 and a radio terminal (UE) 2 according to the first embodiment of the present invention.

FIG. 2 is a block diagram illustrating the radio station 1 and the radio terminal (UE) 2 according to the first embodiment.

In FIG. 2, the radio station 1 is configured by a radio signal receiver (Radio Signal Receiver) 10 that receives radio signals from the radio terminal (UE) 2, a demodulation unit (Demodulator) 11 that demodulates signals received from the radio terminal (UE) 2, a transmission unit (Transmitter) 12 that transmits signals to other network nodes (Other Network Node), a reception unit (Receiver) 13 that receives signals from other network nodes (Other Network Node), a control unit (Controller) 14 that has a function to control a plurality of types of the cells by using one radio access technology (Radio Access Technology: RAT) and that controls operations of the radio station such as transmission and reception of signals, a signal generation unit (Tx signal generator) 15 that generates signals to the radio terminal (UE) 2, and a radio signal transmitter (Radio Signal Transmitter) 16 that transmits radio signals to the radio terminal (UE) 2. In addition, as the radio station 1, a radio base station (eNB) or a base station control station that manages the radio base station (eNB) or the like is considered.

Further, in FIG. 2, the radio terminal (UE) 2 is configured by a radio signal receiver (Radio Signal Receiver) 20 that receives radio signals from the radio station 1, a demodulation unit (Demodulator) 21 that demodulates received signals, a recognition unit 22 that recognizes the type of the cell, a control unit (Controller) 23 that controls terminal operations such as reception of signals, a measurement unit 24 that measures received quality based on the measurement report criteria according to the type of the cell, a signal generation unit (Tx signal generator) 25 that generates signals to the radio station 1, and a radio signal transmitter (Radio Signal Transmitter) 26 that transmits radio signals to the radio station 1.

A configuration of the functional block illustrated in FIG. 2 is one example, and an application of the present invention is not limited to the above configuration.

Figure 3:
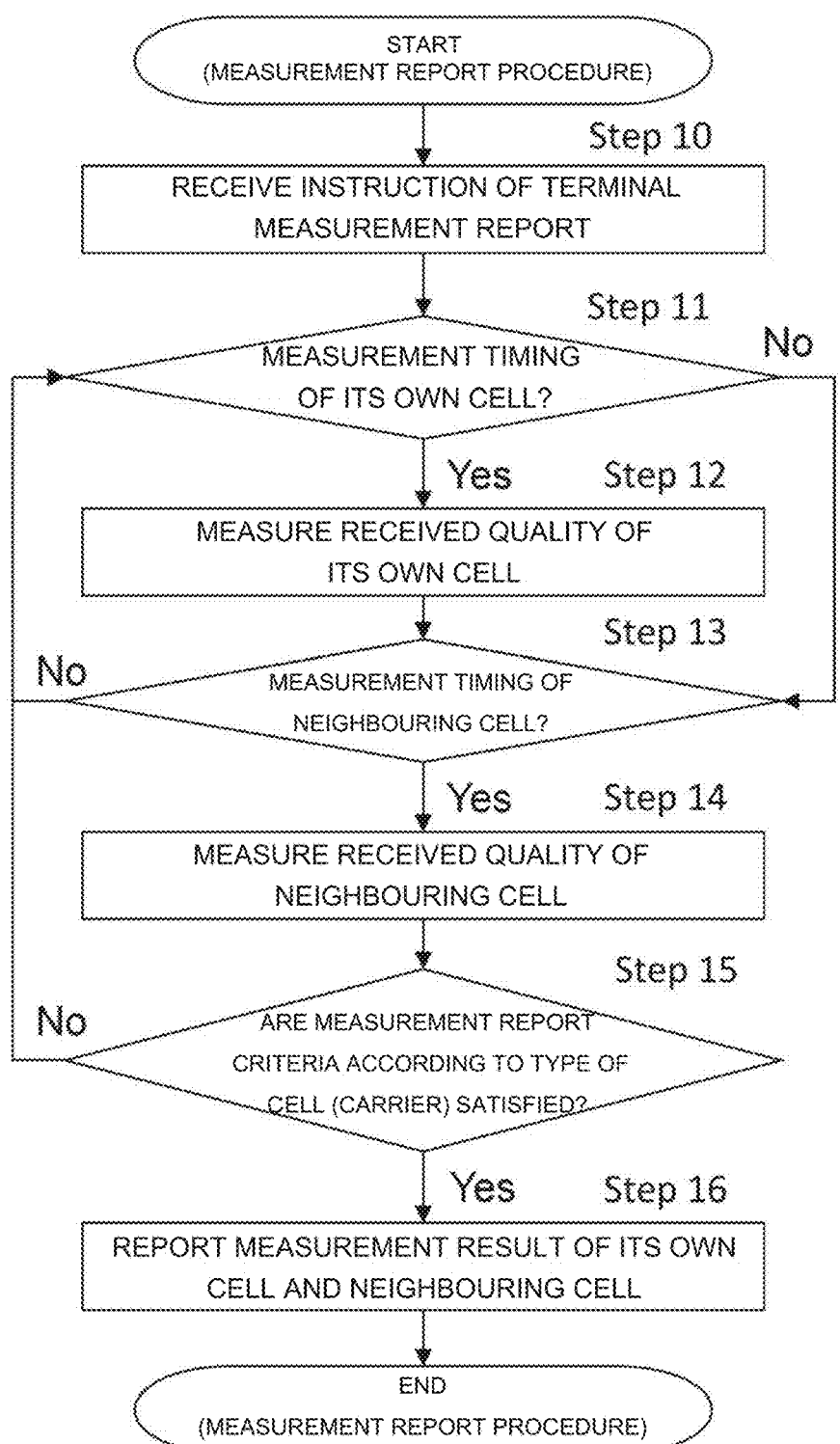
FIG. 3 is a flowchart illustrating a measurement result report by a radio terminal (UE) according to the first embodiment of the present invention.

In FIG. 3, a flowchart of a procedure of the measurement result report by the radio terminal (UE) 2 according to the first embodiment is illustrated.

First, the radio terminal (UE) 2 receives an instruction of the terminal measurement report from the radio station 1 (Step 10). Then, the radio terminal (UE) 2 measures received quality of its own cell (Step 12) at the measurement timing of its own cell (serving cell) (Step 11). Further, the radio terminal (UE) 2 measures received quality of neighbouring cells (Step 14) at the measurement timing of the neighbouring cells (Step 13).

Next, the radio terminal (UE) 2 uses the measurement report criteria according to the type of the cell constituting its own cell and/or the neighbouring cells and determines whether to satisfy the measurement report criteria (Step 15). If the measurement report criteria are satisfied (Yes at Step 15), the radio terminal (UE) 2 reports measurement results of its own cell and the neighbouring cells to the radio station 1 (Step 16).

A trigger may be configured such that in the case that the received quality of a certain neighbouring cell satisfies the measurement report criteria once and then continues to satisfy them during a predetermined period, the radio terminal (UE) reports the measurement results. Further, a report of the measurement results may be performed only once when the measurement report is triggered or continuously performed by the number of predetermined times when triggered. Further, the radio terminal (UE) may report also the type of the cell (or the type of the carrier) to the radio station in the measurement report. Examples of the type of the cell (or the type of the carrier) may include an index indicating a pre-specified type of the cell and information indicating the type of the cell itself.

Figure 4:
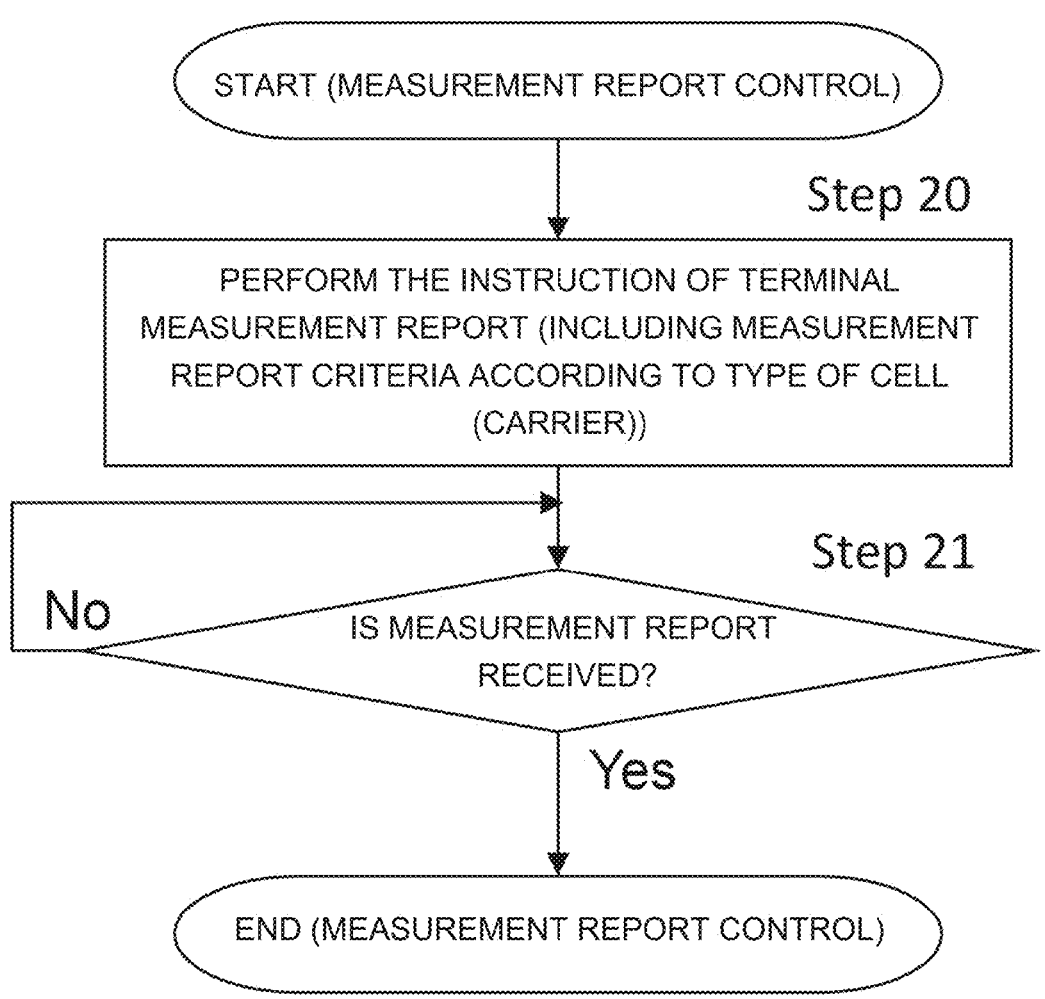
FIG. 4 is a flowchart illustrating a procedure of the measurement result report by the radio station 1 according to the first embodiment of the present invention.

In FIG. 4, a flowchart illustrating a procedure of an instruction and a reception of a report of the measurement result by the radio station 1 according to the first embodiment is illustrated.

The radio station 1 performs the instruction of the terminal measurement report to the radio terminal (UE) 2 (Step 20). Here, in the instruction of the terminal measurement report, the measurement report criteria according to the type of the cell (or the carrier) are included. Then, the radio station 1 receives the measurement report from the radio terminal (UE) 2 (Step 21).

As described above, according to the first embodiment, in the radio system in which different types of the cells are mixed, the radio terminal (UE) is instructed to perform a report of the measurement result in consideration of the type of the cell. As a result, for example, the radio station can appropriately distribute the cells being a handover target of the radio terminal (UE) or distribute the cells that are additionally used by the radio terminal (UE).

In addition, based on the measurement report from the radio terminal (UE), the radio station determines a handover target of the radio terminal (UE) or determines an additional cell (or carrier) at the time of using a plurality of the cells (or the carriers) at the same time. However, a use application of the terminal measurement report is not limited thereto.

Second Embodiment

A second embodiment will be described.

In the second embodiment, there will be described a method for the handover of the radio terminal (UE) using a measurement and a report of the measurement results (also collectively referred to as a terminal measurement report) in consideration of the type of the cell according to the first embodiment as described above.

Suppose that a first cell having as a component a type of the carrier (first carrier) that can be used by all the radio terminals (UEs) in the system and a second cell having as a component a type of the carrier (second carrier) (namely, at least one of downlink carrier and uplink carrier is the second carrier) that can be used by only a part of the radio terminals (UEs) are mixed. In this case, when the terminal measurement report for the handover is performed without considering the type of the cell like a conventional technology, there may arise a problem that the handovers of the radio terminals (UEs) are concentrated to the first cell.

To cope with the above, in the present invention, for example, there are considered the number of the radio terminals (UEs) that are capable of using only the first cells in the system and the number of the radio terminals (UEs) that are capable of using also the second cells or rates thereof, and further the number of the first cells and that of the second cells or rates thereof. Further, the measurement report criteria in the terminal measurement report are configured, and the handover target of the radio terminal (UE) is determined by using the terminal measurement report in consideration of the type of the cell reported from the radio terminal (UE).

For example, when the number of the radio terminals (UEs) that are capable of using the second cell is comparatively small, an offset value, a decision threshold, or a trigger period of the measurement report criteria may be configured so that the radio terminals (UEs) that are capable of using the second cell is facilitated to perform a handover to the second cell, namely, the radio terminals (UEs) is facilitated to perform the measurement report. Further, the radio terminals (UEs) that are capable of using the second cell may perform a handover to the second cell preferentially.

As a result, the handovers by the radio terminals (UEs) can be appropriately distributed to the first cell and the second cell. Accordingly, there can be avoided a concentration of a network signaling necessary for the handover to a specific cell (the radio station that manages it) and a concentration of the traffic after the handover.

Specifically, the control unit 14 of the radio station 1 illustrated in FIG. 2 has a function to determine the cell being a handover target of the radio terminal (UE) 2 based on the measurement result report received from the radio terminal (UE) 2.

Figure 5:
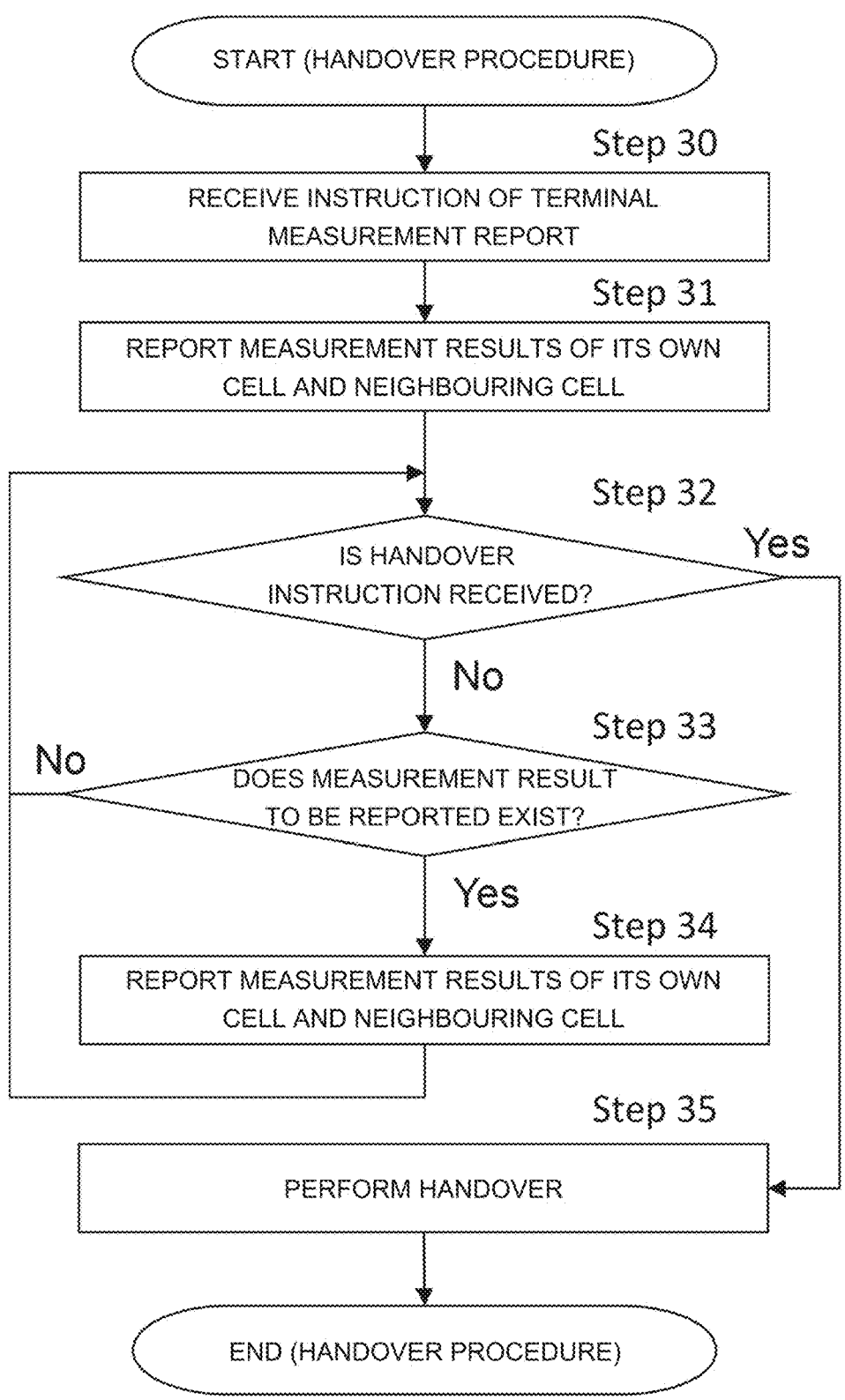
FIG. 5 is a flowchart illustrating a handover procedure by the radio terminal (UE) 2 according to a second embodiment of the present invention.

In FIG. 5, a flowchart of a procedure of the handover by the radio terminal (UE) 2 according to the second embodiment is illustrated.

First, the radio terminal (UE) 2 receives an instruction of the terminal measurement report from the radio station 1 (Step 30), and reports measurement results of its own cell and neighbour cells based on the measurement report criteria according to the type of the cell being a target of the terminal measurement (Step 31). Then, if an instruction of the handover is received (Yes at Step 32), the radio terminal (UE) 2 performs handover processing (Step 35). On the other hand, after the terminal measurement report is performed once (Step 31), until the instruction of the handover is received (Step 32), the radio terminal (UE) 2 repeats a procedure of the terminal measurement report (Steps 33 and 34)

Figure 6:
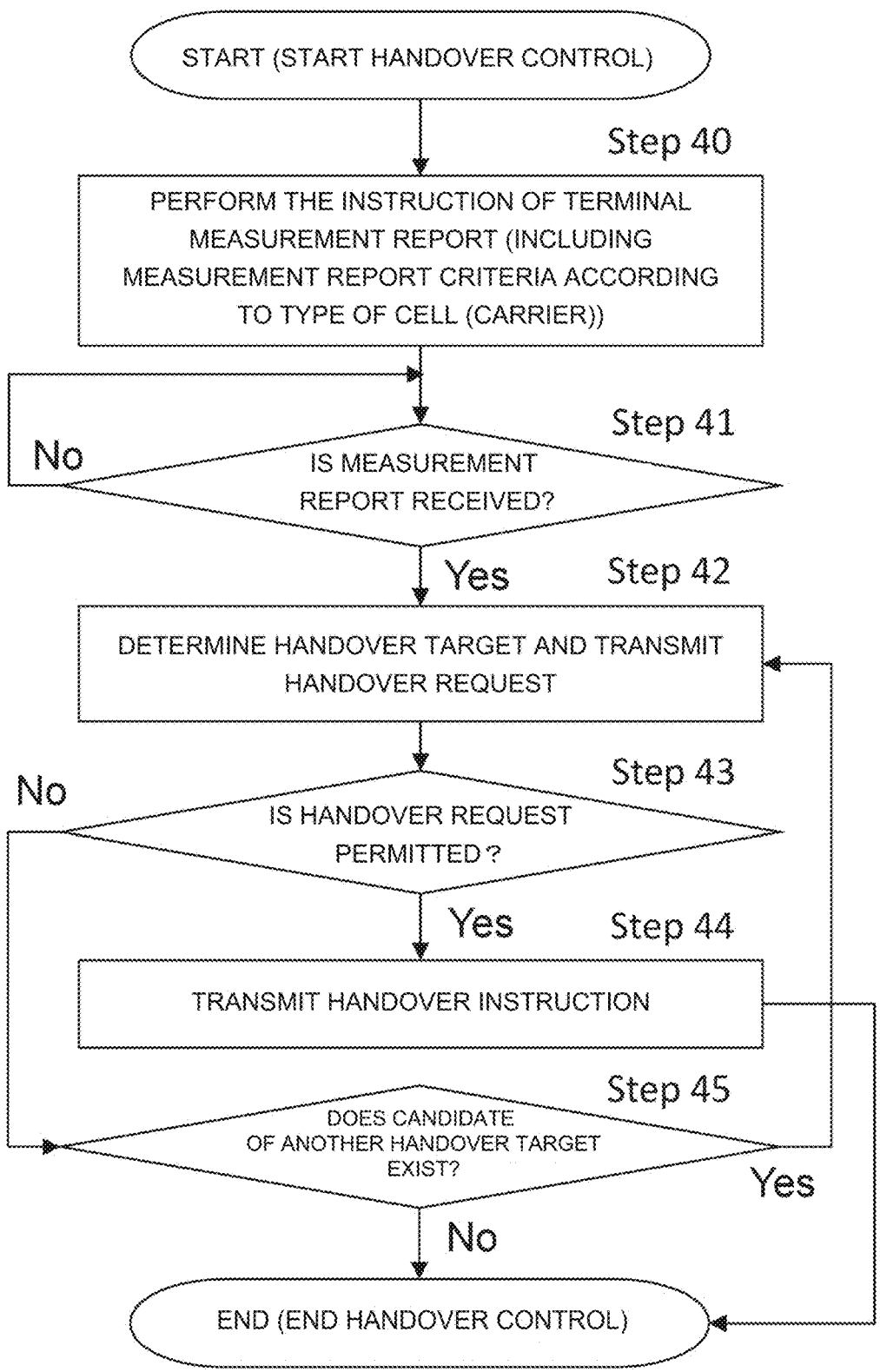
FIG. 6 is a flowchart illustrating a handover control by the radio station 1 according to the second embodiment of the present invention.

In FIG. 6, a flowchart of a handover control by the radio station 1 is illustrated.

First, the radio station 1 instructs the radio terminal (UE) to perform the terminal measurement report (Step 40). In the instruction, the measurement report criteria according to the type of the cell (or the carrier) are included.

If the measurement report is received from the radio terminal (UE) (Yes at Step 41), the radio station 1 determines the handover target, and transmits a handover request to the radio station of the cell being the handover target (Step 42).

Here, a method by which the radio station determines the handover target may be, for example, a method for selecting a cell from most preferable neighbouring cell (also referred to as a best cell) based on the measurement report, or may be other methods. Further, when the radio station knows the type of the neighbouring cell (or the type of the carrier forming the neighbouring cell), the predetermined neighbouring cell (or the type of the carrier forming the neighbouring cell) may be prioritized. A method by which the radio station knows the type (or the type of the carrier forming the neighbouring cell) of the neighbouring cell may be, for example, a method for sharing information between radio stations, or a method by which it is reported from radio terminals (UEs).

If the handover request is permitted (for example, a positive response to the handover request is received) (Yes at Step 43), the radio station 1 transmits the handover instruction to the radio terminal (UE) (Step 44).

On the other hand, if the handover request is not permitted (No at Step 43), the radio station 1 determines whether another candidate of a handover target exists (Step 45). If another candidate of the handover target exists (Yes at Step 45), the same procedure is repeated. On the other hand, if another candidate of the handover target does not exist (No at Step 45), the handover control is ended.

According to the second embodiment, the handover targets of the radio terminal (UE) are appropriately distributed; and as a result, it can be avoided that signaling necessary for the handover and the traffic after the handover concentrate to a specific cell.

Third Embodiment

A third embodiment will be described.

Figure 7:
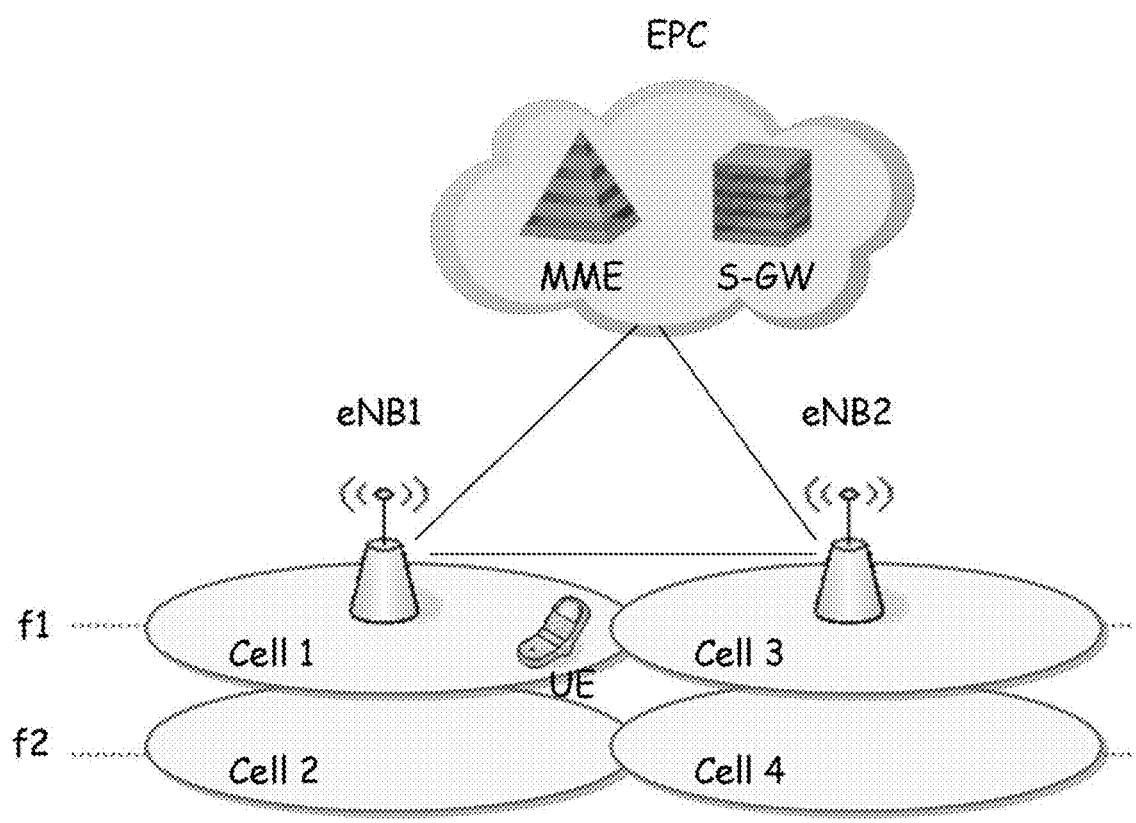
FIG. 7 is a system diagram illustrating an LTE according to a third embodiment of the present invention.

FIG. 7 is a configuration diagram of the third embodiment in the case that a third radio communication system is supposed.

FIG. 7 illustrates a configuration example of a radio communication system of 3GPP LTE (Long Term Evolution) being one of preferred embodiments by applying the present invention. The radio communication system is configured by a radio base station (enhanced Node B: eNB), a cell (Cell) managed by each radio base station (eNB), a radio terminal (User Equipment: UE) that camps on any one of the cells, a core network (Evolved Packet Core: EPC) that manages the radio base stations (eNB), and the like. Further, the core network (EPC) is configured by a mobile management apparatus (Mobility Management Entity: MME), a serving gateway (Serving Gateway: S-GW), etc. for the radio terminal (UE).

In the embodiment of the present invention, the radio base station (eNB) has a function to control different types of cells, namely, a function to perform communication with the radio terminals (UEs) in different types of cells, respectively. Suppose further that at least a part of the radio terminal (UE) has a function to perform communication in a plurality of different types of cells. As described above, it can be said that the radio base station (eNB) or the radio terminal (UE) have a function to perform communication with the radio terminal (UE) or the radio base station (eNB) by using different types of component carriers (Component Carrier: CC). Suppose further that the radio terminal (UE) has a function to recognize the type of the cell, namely, to know the type of the cell or to be aware of the type of the cell. Further, it can be said that the radio terminal (UE) has a function to know a type of a downlink component carrier (DL CC) and/or an uplink component carrier (UL CC), or to be aware of the type of the downlink component carrier (DL CC) and/or the uplink component carrier (UL CC)

Further, the LTE component carrier indicates respective basic frequency components of the downlink and the uplink forming the cell as a base in which the radio base station (eNB) and the radio terminals (UEs) perform communication. Subsequently, unless otherwise noted, the component carrier is simply described as a carrier.

In the present embodiment, the radio terminal (UE) performs a report of the measurement result based on the measurement report criteria according to the type of the cell (or the component carrier). As the measurement report criteria, for example, the following matters are considered.

An offset value related to the received quality
A decision threshold related to the received quality
A trigger period as a trigger of a report of a measurement result
A combination of the above The offset value is an offset value related to the received quality of each cell used for a determination whether a report of the measurement result (hereinafter, referred to as a measurement report (measurement report)) is performed or a determination whether the measurement result report is aborted. Similarly, the decision threshold is a decision threshold related to the received quality of each cell used for a determination whether the measurement report is performed or a determination whether the measurement report is aborted. The trigger period is a period (Time To Trigger: TTT) used for a determination in which the measurement report of an event trigger is performed, and when the measurement results satisfy a predetermined event during the trigger period, the radio terminal (UE) performs the measurement report.

In addition, as the received quality here said, received signal power (Reference Signal Received Power: RSRP), received signal quality (Reference Signal Received Quality: RSRQ), and received signal strength (Received Signal Strength Indicator: RSSI) of reference signals (Reference Signal: RS) transmitted in each cell are supposed; however, not limited thereto.

The offset value and/or the decision threshold are configured in each event for the measurement report. As the event, the offset value and/or the decision threshold of the LTE, for example, the following matters are cited.

A1: The received quality of the serving cell is better than the decision threshold (a1-Threshold) (Serving becomes better than absolute threshold).

A2: The received quality of the serving cell is worse than the decision threshold (a2-Threshold) (Serving becomes worse than absolute threshold).

A3: The received quality of the neighbour cell is better by the offset value (a3-Offset) than that of a primary serving cell (Neighbour becomes amount of offset better than PCell).

A4: The received quality of the neighbouring cell is better than the decision threshold (a4-Threshold) (Neighbour becomes better than absolute threshold).

A5: The received quality of the primary serving cell is worse than the decision threshold 1 (a5-Threshold1) and the received quality of the neighbouring cell is better than the decision threshold 2 (a5-Threshold2) (PCell becomes worse than absolute threshold AND Neighbour becomes better than another absolute threshold2).

A6: The received quality of the neighbouring cell is better by the offset value (a6-Offset) than that of a secondary serving cell (Neighbour becomes amount of offset better than SCell).

B1: The received quality of the neighbouring cell in another radio access technology (RAT) is better than the decision threshold (b1-Threshold) (Neighbour becomes better than absolute threshold).

B2: The received quality of the primary serving cell is worse than the decision threshold 1 (b2-Threshold1) and the received quality of the neighbouring cell in the another radio access technology (RAT) is better than the decision threshold 2 (b2-Threshold2) (PCell becomes worse than absolute threshold1 AND Neighbour becomes better than another absolute threshold2).

In the present invention, the above-described offset value, decision threshold, and trigger period are further configured in accordance with the type of the component carrier. Suppose, for example, that cells (New Type Carrier (NTC) Cell) having new carriers and cells (Legacy Cell) having conventional carriers are mixed and the number of the radio terminals (UEs) that are capable of using new carrier cells (NTC Cell) is small. In this case, the offset value, the decision threshold, or the trigger period is configured to the radio terminals (UEs) that are capable of using the new carrier cells (NTC Cell) so that they are facilitated to perform a handover to the new carrier cell (NTC Cell). On the other hand, when the radio terminals (UEs) that are capable of using the new carrier cell (NTC Cell) become dominant, the offset value, the decision threshold, or the trigger period is configured to the radio terminals (UEs) that are capable of using the new carrier cell (NTC Cell) so that they are appropriately distributed to both the conventional carrier cells (Legacy Cells) and the new carrier cells (NTC Cells). Through the above, the radio base station (eNB) can appropriately distribute the cells being the handover targets of the radio terminals (UEs), or distribute the cells used as additional secondary cells (Secondary Cell: SCell) for performing a carrier aggregation (Carrier Aggregation: CA) by the radio terminals (UEs).

Further, the measurement report criteria according to the type of the cell (or the component carrier) may be broadcast by using the system information (System Information Block: SIB) from the radio base station (eNB) to the radio terminals (UEs), may be informed by using individual signals (Dedicated Signaling) from the radio base station (eNB) to the radio terminals (UEs), or may be preconfigured to the radio terminals (UEs).

Further, cell support information (or carrier support information) about which type of the cell (or which type of the component carrier) the radio terminal (UE) is capable of using may be included in functional information (for example, Radio Access Capability and/or Radio Frequency Capability) of a radio unit of the radio terminal (UE) or other functional information (for example, NAS Capability and/or UE Capability) inherent to the radio terminal (UE). When the cell support information (or the carrier support information) is included in the functional information of the radio unit, that information is informed from the radio terminal (UE) to the radio base station (eNB). On the other hand, when the cell support information (or the carrier support information) is included in the other functional information inherent to the radio terminal (UE), that information is informed from the mobile management apparatus (MME) of the core network (EPC) to the radio base station (eNB). The method for informing the cell support information is not limited thereto.

Here, as the type of the cell, for example, the following matters are considered.

A cell to which a conventional (legacy) radio terminal (UE) is accessible

A cell to which only a radio terminal (UE) having a specific capability (or function) is accessible A cell to which a conventional (legacy) radio terminal (UE) is accessible only for a specific usage Here, the conventional (legacy) radio terminal (UE) is, for example, a radio terminal (UE) that has no function to perform a terminal measurement report based on the measurement report criteria according to the type of the cell (or the carrier). On the other hand, the specific capability (or function) is, for example, a capability (or a function) to perform a terminal measurement report based on the measurement report criteria according to the type of the cell (or the carrier). Further, as the specific usage, it is considered, for example, to use a secondary cell (Secondary Cell: SCell) (namely, a secondary component carrier (Secondary CC: SCC)) for a carrier aggregation (Carrier Aggregation: CA) in which a plurality of the LTE cells (namely, the component carrier (CC)) are used at the same time for communication.

As described above, "the cell selection criteria according to the type of the cell" may be safely said as (may be safely replaced by) "the cell selection criteria according to the type of the component carrier". Here, the types of the component carriers are classified based on predetermined characteristics related to a transmission configuration of signals transmitted by using the component carriers. As the predetermined characteristics, for example, the following matters are considered.

A configuration of the physical channels (Physical channel)

A transmission configuration of the reference signal (Reference Signal: RS) transmitted by the radio base station (eNB)

A transmission configuration of the control signal (Control Signal) transmitted by the radio station A transmission configuration of the system information (System Information: SI) transmitted by the radio station A type of the system information (System Information: SI) transmitted by the radio base station (eNB)

A radio transmission scheme (Radio Access Scheme)

A duplex operation (Duplex mode)

As the configuration of the physical channels, for example, mapping of the physical channels (Physical Channel Mapping), namely, an allocation method of radio resources used in transmission of each physical channel is considered. Examples of the transmission configuration of the reference signal (RS) that is a known signal include a transmission period, a transmission band, a transmission density, a signal power density, a signal arrangement, a signal sequence, the number of transmission antennas of reference signals (RS) inherent to the cell (CRS), and the types of the transmitted reference signals (RS). Examples of the type of the system information (System Information: SI) include a kind of the system information (System Information: SI) transmitted regardless of the types of the cells (or the component carriers), a kind of the system information (System Information: SI) transmitted only in a specific type of the cell (or the component carrier), and the like.

As described above, the radio terminal (UE) is capable of recognizing the type of the cell (or the component carrier) and is capable of performing a report of the measurement result based on the measurement report criteria according to the type of the cell (or the component carrier).

Figure 8:
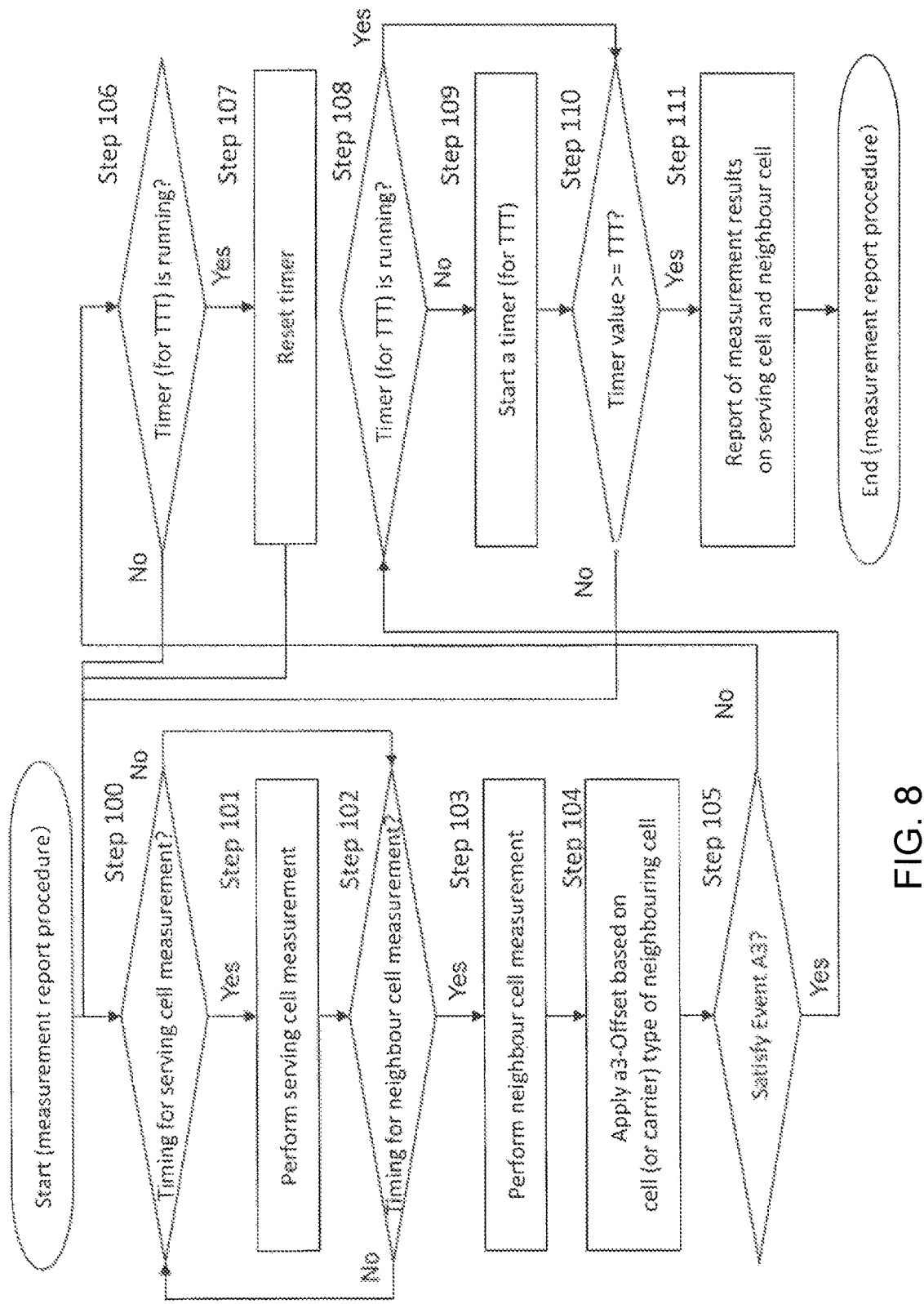
FIG. 8 is a flowchart illustrating a procedure of the measurement result report according to the third embodiment of the present invention.

Next, a procedure of a report of the measurement result according to the present embodiment will be described. FIG. 8 is a flowchart of a procedure of report of the measurement result according to the present embodiment.

In the following descriptions, the radio base station (eNB) instructs the radio terminal (UE) to perform the terminal measurement report by using an Event A3, and at this time, configures the offset value (a3-Offset) in accordance with the type of the neighbouring cell. For example, there will be described a case in which an offset value for the cell (Legacy Cell) having as a component the conventional carrier (Legacy carrier) is configured to a3-Offset and an offset value for the cell (NTC Cell) having as a component the new carrier (New Type Carrier: NTC) (or including as a component the new carrier (New Type Carrier: NTC)) is configured to a3-Offset2.

At predetermined timing (Yes at Step 100), the radio terminal (UE) measures the received quality of its own cell (serving cell) (Step 101). Similarly, at another predetermined timing (Yes at Step 102), the radio terminal (UE) measures the received quality of the neighbouring cell (Step 103).

Further, the radio terminal (UE) applies the a3-Offset according to the type of the neighbouring cell (or the carrier as a component of the neighbouring cell) (Step 104), and determines whether each of the neighbouring cells satisfies conditions of the event A3 (Step 105).

If the condition of the event A3 is not satisfied (No at Step 105), the radio terminal (UE) determines whether a timer that measures the trigger period (TTT) is previously running (Step 106). If the timer is running (Yes at Step 106), the timer is reset (Step 107), and the process returns to Step 100. On the other hand, if the timer is not running (No at Step 106), the process returns to Step 100.

Further, if the condition of the event A3 is satisfied (Yes at Step 105), the radio terminal (UE) determines whether the timer that measures the trigger period (TTT) is previously running (Step 108). If the timer is not running (No at Step 108), the timer is started (Step 109), and the process proceeds to Step 110. If the timer that measures the trigger period (TTT) is previously running (Yes at Step 108), the process proceeds to Step 110.

Next, the radio terminal (UE) determines whether a timer value has reached to the trigger period (TTT) (Step 110). If the timer value has reached to the trigger period (TTT) (Yes at Step 110), the radio terminal (UE) reports measurement results of the serving cell and the neighbouring cell that satisfies the condition of the event A3 to the radio base station (eNB) (Step 111). On the other hand, if the timer value has not reached the trigger period (TTT) (No at Step 110), the similar process is repeated.

If the condition of the event A3 is satisfied, the radio terminal (UE) may perform a report of the measurement result only once (Event-triggered reporting), or after the condition of the event A3 is satisfied, the radio terminal (UE) may perform a report of the measurement result periodically by the predetermined number of times (Event-triggered periodic reporting). Further, when the measurement report is performed, the radio terminal (UE) may report also the type of the carrier (or the type of the cell) to the radio base station (eNB).

Here, the event A3 will be described. The conditions of the event A3 are described in detail by formula (1).

$$Mn+Ofn+Ocn-Hys>Mp+Ofp+Ocp+Off \quad (1)$$

Definitions of each parameter are as described below. Conditions of a case in which the terminal measurement report is aborted are that an inequality sign of formula (1) and a sign of Hys are opposite to those of formula (1) as represented above.

- Mn: A measurement result of the received quality of the neighbouring cell
- Ofn: A frequency specific offset value (namely, an offset value (offsetFreq) specified in each frequency by a measurement instruction (measObjectEUTRA) for the LTE cell) for the neighbouring cell
- Ocn: A cell specific offset value (namely, an offset value (cellIndividualOffset) specified in each neighbouring cell by the measurement instruction (measObjectEUTRA) for the LTE cell) for the neighbouring cell
- Mp: A measurement result of the received quality of the primary serving cell
- Ofp: A frequency specific offset value (namely, an offset value (offsetFreq) specified to a primary frequency by the measurement instruction (measObjectEUTRA) for the LTE cell) for the primary frequency (namely, a frequency of the primary serving cell)
- Ocp: A cell specific offset value (namely, an offset value (cellIndividualOffset) specified to the primary frequency by the measurement instruction (measObjectEUTRA) for the LTE cell) of the primary serving cell
- Hys: A hysteresis parameter (namely, hysteresis (hysteresis) specified to the event by the measurement instruction (measObjectEUTRA) for the LTE cell) in the event
- Off: An offset value (namely, an offset value (a3-Offset) specified to the event by the measurement instruction (measObjectEUTRA) for the LTE cell) in the event In addition, in the case of the Reference Signal Received Power (RSRP), Mn and Mp are indicated by [dBm], and in the case of the Reference Signal Received Quality (RSRQ), they are indicated by [dB]. Further, Ofn, Ocn, Ofp, Ocp, Hys, and Off are indicated by [dB].

Further, the above is one example, and in the present invention, the parameters may be also configured in accordance with the type of the cell (or the carrier).

Figure 10:
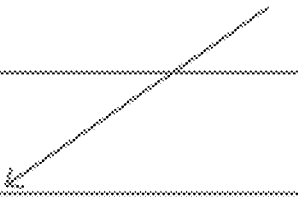
FIG. 10 illustrates another transmission configuration of a parameter used for the measurement report criteria by the radio terminal (UE) according to the third embodiment of the present invention.

Further, as a notification method of the measurement report criteria (for example, the above-described parameters) according to the type of the cell (or the carrier) of the present invention, for example, methods as illustrated in FIGS. 9 and 10 are considered.

There is used one method in which the radio base station (eNB) configures an individual parameter according to the type (or the type of the carrier) of the cell in information (ReportConfigEUTRA) indicating a method of the measurement report of the radio terminal (UE) for the LTE cell.

In an example of FIG. 9, there is illustrated an example in which the offset value (a3-Offset) is configured in accordance with the type of the carrier by using the event A3 (Event A3). For example, the offset value (a3-Offset) is applied to the measurement report for the conventional (legacy) cell (or carrier) in a conventional manner, and an offset value (a3-Offset-r1x) is applied to the measurement report for the new cell (or carrier). For example, the offset value (a3-Offset-r1x) corresponds to the above-described offset value (a3-Offset2).

Further, there may be used another method in which the radio base station (eNB) configures information (ReportConfigEUTRA) indicating a method of the measurement report for the LTE cell to report configuration information (reportConfigToAddModList) in measurement configuration information (MeasConfig) indicating a method of the measurement and the measurement report of the radio terminal (UE), in accordance with the type of the cell (or the type of the carrier).

FIG. 10 illustrates an example of the case in which information (ReportConfigEUTRA) indicating a method of the measurement report for the conventional (legacy) cell (or carrier) and information (ReportConfigEUTRA-r1x) indicating a method of the measurement report for the new cell (or carrier) are transmitted.

As a recognition method of the type of the cell (or the type of the carrier) by the radio terminal (UE), the following methods are considered. For example, there is considered a method in which the type of the cell (or a type of the downlink carrier and a type of the uplink carrier) is indicated by using the system information (System Information Block: SIB) transmitted from the radio base station (eNB) and the radio terminal (UE) demodulates the system information to thereby recognize the type of the cell (or the type of the carrier). As other methods, for example, the radio terminal (UE) recognizes (may also be considered as detection) the type of the cell (or the type of the downlink carrier as a component of the cell) depending on whether a reference signal (RS, for example, CRS) and/or a synchronization signal (SS) transmitted in the conventional (legacy) LTE carrier (for example, the first carrier) is transmitted, whether the transmission configuration of the reference signal (RS) and/or the synchronization signal (SS) is the same as that of the reference signal (RS) or the synchronization signal (SS) transmitted in a conventional LTE carrier, whether the reference signal (RS) and/or the synchronization signal (SS)

is transmitted with the transmission configuration specified for a predetermined type of the cell (or the downlink carrier (for example, the second carrier)), or whether transmitted is the reference signal (RS) and/or the synchronization signal (SS) specified for a predetermined type of the cell (or the downlink carrier).

Fourth Embodiment

A fourth embodiment will be described.

In the fourth embodiment, the present invention is applied to 3GPP LTE, and there will be described an example in which the radio base station (eNB) configures for the radio terminal (UE) the event according to each type of the neighbouring cell (or the carrier as a component of the neighbouring cell) and instructs to perform the terminal measurement report.

Suppose, for example, that there is configured an LTE system in which the cell having as a component the conventional carrier (Legacy carrier) and the cell (New type cell) having as a component the new carrier (New type carrier) (or including as a component the new carrier) are mixed. In this case, the event as described below may be specified.

Figure 11:
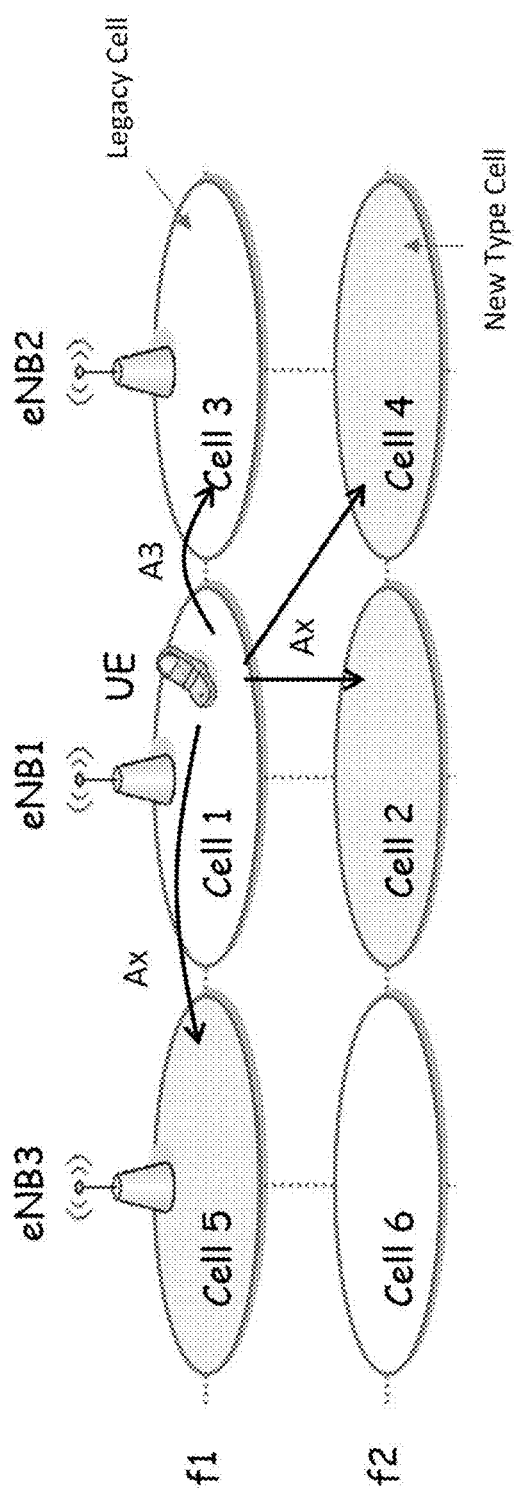
FIG. 11 illustrates an instruction of a measurement report according to a fourth embodiment of the present invention.
Figure 12:
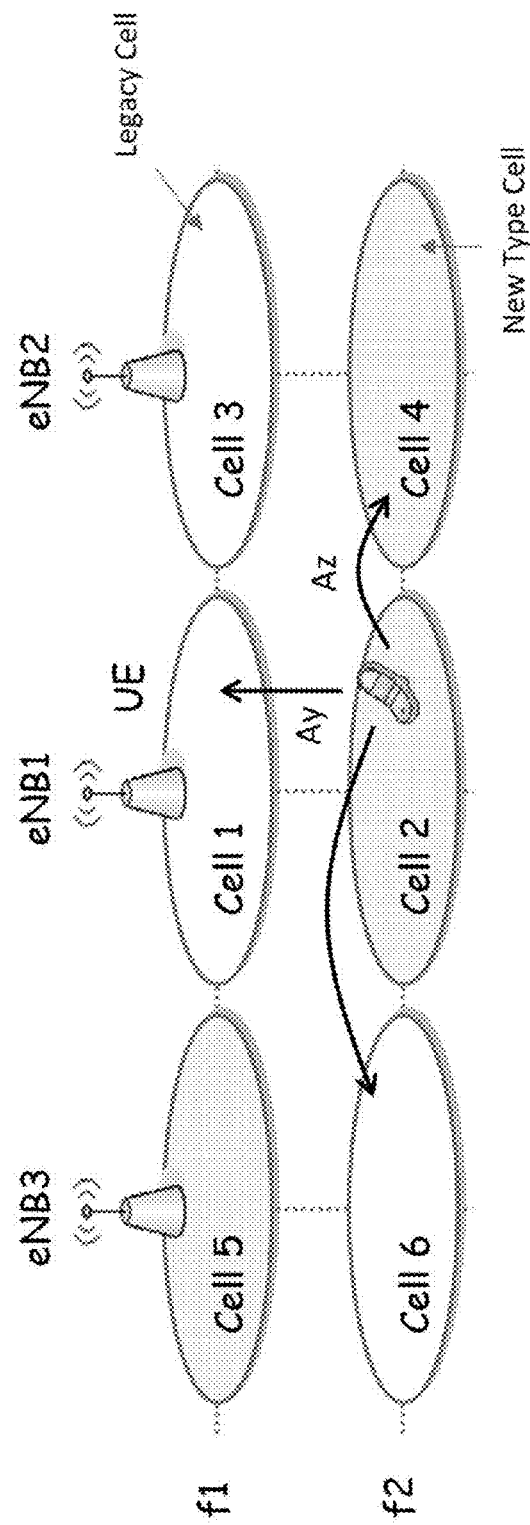
FIG. 12 illustrates an instruction of the measurement report according to the fourth embodiment of the present invention.

In the state as illustrated in FIG. 11, for example, the radio base stations (eNB) instruct the radio terminal (UE) to perform the terminal measurement report by using the event Ax. The event Ax is as described below.

Ax: The received quality of a new type of the neighbouring cell is better by the offset value (ax-Offset) than that of the primary serving cell (Neighbour new type cell becomes amount of offset better than PCell).

Figure 13:
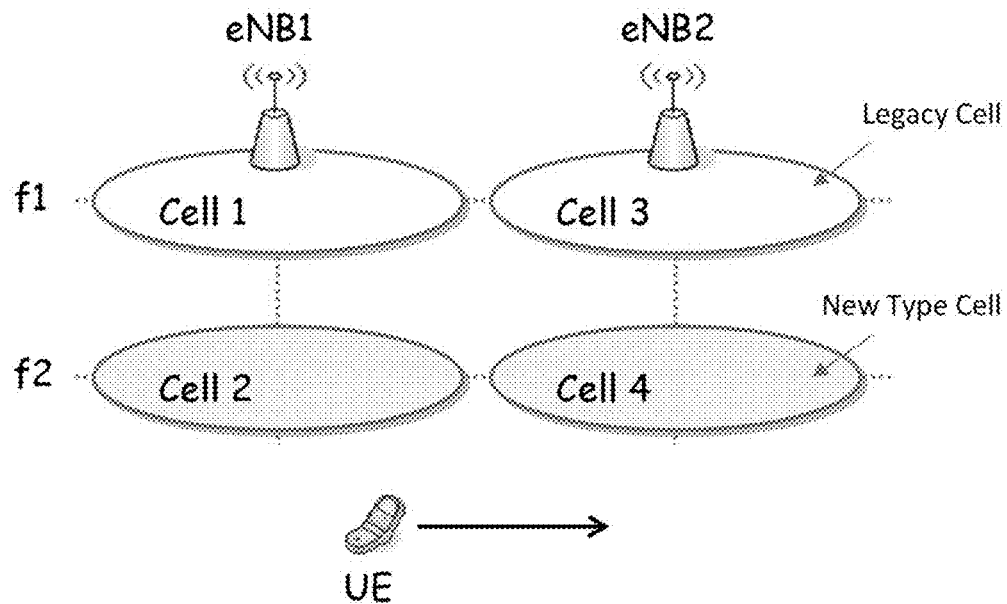
FIG. 13 illustrates a method for determining a handover target according to a fifth embodiment of the present invention.

Further, in the state as illustrated in FIG. 13, the radio base stations (eNB) instruct the radio terminal (UE) to perform the terminal measurement report by using events Ay and Az. The events Ay and Az are as described below.

Ay: The received quality of the neighbouring cell is better by the offset value (ay-Offset) than that of a new type of the primary serving cell (Neighbour becomes amount of offset better than new type PCell).

Az: The received quality of the new type of the neighbouring cell is better by the offset value (az-Offset) than that of the new type of the primary serving cell (Neighbour new type cell becomes amount of offset better than new type PCell).

In addition, it goes without saying that a new event can be configured similarly also when two or more types of the cells (or the carriers) are mixed. There is considered a method in which in place of the new type of the cell (New type Cell), for example, like the cell with a type xx, the cell with a type yy, and the cell with a type zz, a predetermined index is given to the type of the cell (or the carrier as a component of the cell) and the event is configured to the cell with each index.

Fifth Embodiment

A fifth embodiment will be described.

In the fifth embodiment, the present invention is applied to 3GPP LTE, and a determination method of a handover target of the radio terminal (UE) by the radio base station (eNB) will be described with reference to FIG. 13. In addition, the terminal measurement report by the radio terminal (UE) is supposed to be performed, for example, by using the fourth embodiment.

In FIG. 13, a Cell 1 and a Cell 3 belong to a first cell that has as a component the first carrier and on which conventional (legacy) radio terminals (UEs) are capable of camping, and a Cell 2 and a Cell 4 belong to a second cell that has as a component the second carrier and on which a part of the radio terminal (UE) are capable of camping. Here, when the radio terminal (UE) is moving, the decision of the handover target of the radio terminal (UE) by the radio base station (eNB) may be executed, for example, as described below. Here, as an index of the received quality used for the handover decision, the Reference Signal Received Power (RSRP) is used, and further it goes without saying that the Reference Signal Received Quality (RSRQ) may be used similarly.

Case 1) The Cell 3 satisfies a predetermined event, and the Cell 4 does not satisfy it. In this case, the Cell 3 is determined as the handover target of the radio terminal (UE).

Case 2) The Cell 3 does not satisfy the predetermined event, but the Cell 4 satisfies it. In this case, the Cell 4 is determined as the handover target of the radio terminal (UE).

Case 3) Both of the Cell 3 and the Cell 4 satisfy the predetermined event, and Reference Signal Received Power 3 (RSRP3)>Reference Signal Received Power 4 (RSRP4) is satisfied. In this case, the Cell 3 is determined as the handover target of the radio terminal (UE).

Case 4) Both of the Cell 3 and the Cell 4 satisfy the predetermined event, and Reference Signal Received Power 3 (RSRP3)<Reference Signal Received Power 4 (RSRP4) is satisfied. In this case, the Cell 4 is determined as the handover target of the radio terminal (UE).

Case 5) Both of the Cell 3 and the Cell 4 satisfy the predetermined event, and the Cell 3 is higher in the priority than the Cell 4. In this case, the Cell 3 is determined as the handover target of the radio terminal (UE).

Case 6) Both of the Cell 3 and the Cell 4 satisfy the predetermined event, and the Cell 3 is lower in the priority than the Cell 4. In this case, the Cell 4 is determined as the handover target of the radio terminal (UE).

According to the present embodiment, the handover targets of the radio terminal (UE) are appropriately distributed. As a result, there can be avoided a concentration to a specific cell of signaling necessary for the handover and that of the traffic after the handover.

Sixth Embodiment

A sixth embodiment will be described.

In the sixth embodiment, the present invention is applied to a carrier aggregation (CA) of 3GPP LTE, and a determination method of a secondary cell (SCell) of the radio terminal (UE) by the radio base station (eNB) will be described with reference to FIG. 14. In addition, the terminal measurement report by the radio terminal (UE) is supposed to be performed, for example, by using the fourth embodiment.

Figure 14:
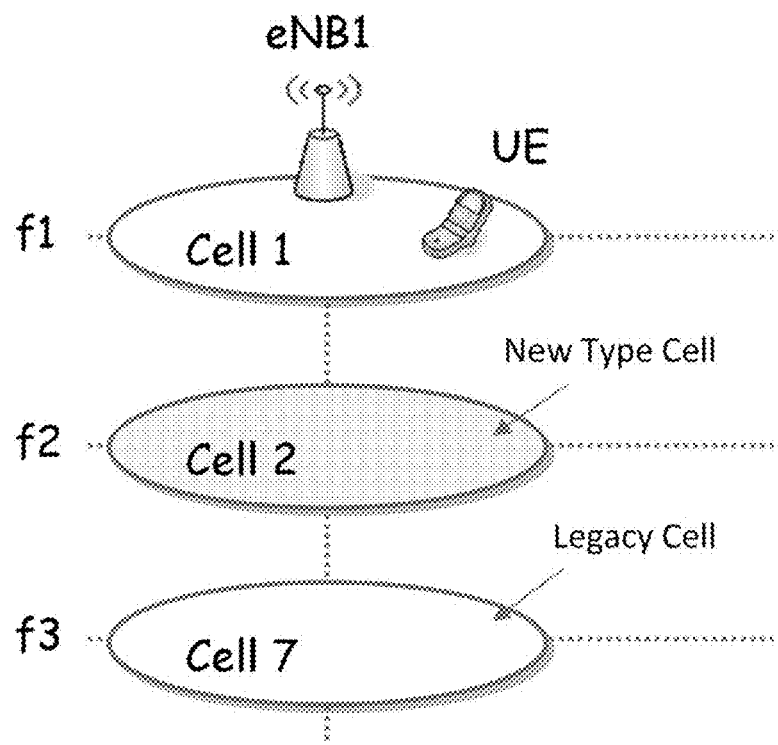
FIG. 14 illustrates a sixth embodiment of the present invention.
Figure 15:
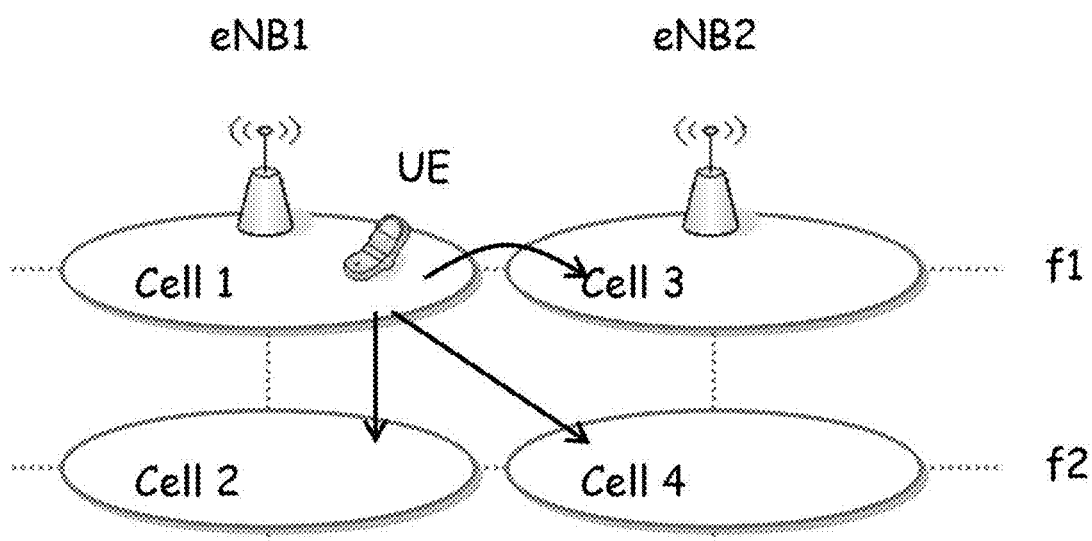
FIG. 15 is a system diagram illustrating a cell selection and a cell reselection by a conventional radio terminal (UE).

In FIG. 14, the radio terminal (UE) is supposed to camp on the Cell 1 and perform communication with the radio base station (eNB) 1. The Cell 1 and a cell 7 of the radio base station (eNB) 1 belong to a first cell that has as a component a first carrier and on which conventional (legacy) radio terminals (UEs) are capable of camping, and the Cell 2 belongs to a second cell that has as a component a second carrier and that a part of the radio terminal (UE) is capable of using as a secondary cell. Suppose in the present embodiment that the radio base station (eNB) 1 determines that the amount of traffic communicated by the radio terminal (UE) is large and it is necessary to instruct the radio terminal (UE) to perform the carrier aggregation (CA) (or CA is effective). In this case, the secondary cell (SCell) may be determined, for example, as described below. Here, the secondary cell (SCell) is supposed to be added by one. Further, as an index of the received quality used to determine the secondary cell (SCell), the Reference Signal Received Quality (RSRQ) is used; further, it goes without saying that the Reference Signal Received Power (RSRP) can be also used similarly.

Case 1) The Cell 2 satisfies a predetermined event, and the Cell 7 does not satisfy it. In this case, the Cell 2 is determined as the secondary cell (SCell).

Case 2) The Cell 2 does not satisfy the predetermined event, but the Cell 7 satisfies it. In this case, the Cell 7 is determined as the secondary cell (SCell).

Case 3) Both of the Cell 2 and the Cell 7 satisfy the predetermined event, and Reference Signal Received Quality 2 (RSRQ2)>Reference Signal Received Quality 7 (RSRQ7) is satisfied. In this case, the Cell 2 is determined as the secondary cell (SCell).

Case 4) Both of the Cell 2 and the Cell 7 satisfy the predetermined event, and Reference Signal Received Quality 2 (RSRQ2)<Reference Signal Received Quality 7 (RSRQ7) is satisfied. In this case, the Cell 7 is determined as the secondary cell (SCell).

Case 5) Both of the Cell 2 and the Cell 7 satisfy the predetermined event, and the Cell 2 is higher in the priority than the Cell 7. In this case, the Cell 2 is determined as the secondary cell (SCell).

Case 6) Both of the Cell 2 and the Cell 7 satisfy the predetermined event, and the Cell 2 is lower in the priority than the Cell 7. In this case, the Cell 7 is determined as the secondary cell (SCell).

According to the present embodiment, the secondary cells (SCells) are appropriately distributed during the carrier aggregation (CA) by the radio terminal (UE). As a result, a concentration of the traffic to a specific cell can be avoided.

Further, when there is configured the LTE system in which the cells each having a conventional carrier (Legacy carrier) as a component and the cells (New type cells) each having a new carrier (New type carrier) as a component (or each include a new carrier as a component) are mixed, the event as described below may be regulated.

Ai: The received quality of a new type of the neighbouring cell is better by the offset value (ai-Offset) than that of the secondary serving cell (Neighbour new type cell becomes amount of offset better than SCell).

Aj: The received quality of the neighbouring cell is better by the offset value (aj-Offset) than that of a new type of the secondary serving cell (Neighbour cell becomes amount of offset better than new type SCell).

Ak: The received quality of the new type of the neighbouring cell is better by the offset value (ak-Offset) than that of the new type of the secondary serving cell (Neighbour new type cell becomes amount of offset better than new type SCell).

In addition, it goes without saying that a new event can be configured similarly also when two or more types of the cells (or the carriers) are mixed. There is considered a method in which in place of the new type of the cell (New type Cell), for example, like the cell with a type xx, the cell with a type yy, and the cell with a type zz, a predetermined index is given to the type of the cell (or the carrier as a component of the cell) and the event is configured to the cell of each index.

In the embodiment of the LTE as described above, a Homogeneous Network in which only cells of a macro radio base station (Macro eNB) are present is supposed; however, an application scope of the present invention is not limited thereto. For example, it goes without saying that the present invention is applicable also to a Heterogeneous Network (HetNet) in which a macro radio base station (Macro eNB), a pico radio base station (Pico eNB), and a femto radio base station (Femto eNB) are mixed.

In the embodiment as described above, as the radio communication system, 3GPP LTE is further supposed and described; however, the objects of the present invention are not limited thereto. Further, the present invention is applicable to GSM (Global System for Mobile communications), UMTS (Universal Mobile Telecommunications System), CDMA 2000 (Code Division Multiple Access 2000) and evolved versions thereof (1×RTT and HRPD), WiMAX (Worldwide interoperability for Microwave Access), and the like.

Further, the present invention is not necessarily limited to the above embodiments, but can be variously verified and performed in a range of technical idea. Further, the above embodiments may be arbitrarily performed in combination thereof.

As apparent from the above description, it is possible to constitute each unit by hardware. Alternatively, it is possible to achieve a function of each unit by a computer program. In this case, a processor operating on a program stored in a program memory realizes the functions and the operations as described in the above embodiments.

Further, the above embodiments may be partially or entirely described similarly to, but not limited to, the following supplementary notes.

(Supplementary note 1) A radio communication system in which a radio station and a radio terminal communicate with each other, including:

a control means with which at least one of the radio stations controls a plurality of types of cells by using one radio access technology;

a recognition means with which the radio terminal recognizes a type of a cell; and a measurement report means with which the radio terminal reports measurement results based on measurement report criteria according to the type of the cell.

(Supplementary note 2) The radio communication system described in the supplementary note 1, wherein the type of the cell is identified by a type of a carrier as a component of the cell.

(Supplementary note 3) The radio communication system described in the supplementary note 2, wherein the type of the carrier is classified by a transmission configuration of a transmitted signal.

(Supplementary note 4) The radio communication system described in the supplementary note 2 or 3, wherein the type of the carrier is classified by a configuration of a physical channel.

(Supplementary note 5) The radio communication system described in any one of the supplementary notes 2 to 4, wherein the type of the carrier is classified by the transmission configuration of at least any one of a known signal, system information, and a control signal transmitted from the radio station in the carrier.

(Supplementary note 6) The radio communication system described in any one of the supplementary notes 2 to 5, wherein the type of the carrier is classified by contents of the system information.

(Supplementary note 7) The radio communication system described in any one of the supplementary notes 2 to 6, wherein the type of the carrier is classified by a radio transmission scheme.

(Supplementary note 8) The radio communication system described in any one of the supplementary notes 2 to 7, wherein the type of the carrier is classified by a duplex mode.

(Supplementary note 9) The radio communication system described in any one of the supplementary notes 1 to 8, wherein the measurement report criteria include at least one of an offset value related to received quality, a decision threshold related to the received quality, and a trigger period as a trigger of a report of the measurement results.

(Supplementary note 10) The radio communication system described in any one of the supplementary notes 1 to 9, wherein the measurement report criteria are configured by using different events for each type of the cell or for each predetermined group of the type of the cell.

(Supplementary note 11) The radio communication system described in any one of the supplementary notes 1 to 10, wherein the radio station transmits the measurement report criteria to the radio terminal.

(Supplementary note 12) The radio communication system described in any one of the supplementary notes 1 to 11, wherein the radio station determines a cell of a handover target of the radio terminal based on the measurement results reported from the radio terminal.

(Supplementary note 13) The radio communication system described in the supplementary note 12, wherein the radio station preferentially determines a predetermined type of the cell as the handover target of the radio terminal.

(Supplementary note 14) The radio communication system described in any one of the supplementary notes 1 to 11, wherein the radio station determines an additional serving cell of the radio terminal based on the measurement results reported from the radio terminal.

(Supplementary note 15) The radio communication system described in the supplementary note 14, wherein the radio station preferentially determines a predetermined type of the cell as the additional serving cell of the radio terminal.

(Supplementary note 16) A radio terminal for use in a radio communication system in which a radio station controls a plurality of types of cells by using one radio access technology, including:

a recognition means that recognizes a type of a cell; and a measurement report means that reports measurement results based on measurement report criteria according to the type of the cell.

(Supplementary note 17) The radio terminal described in the supplementary note 16, wherein the type of the cell is identified by a type of a carrier as a component of the cell.

(Supplementary note 18) The radio terminal described in the supplementary note 17, wherein the type of the carrier is classified by a transmission configuration of a transmitted signal.

(Supplementary note 19) The radio terminal described in the supplementary note 17 or 18, wherein the type of the carrier is classified by a configuration of a physical channel.

(Supplementary note 20) The radio terminal described in any one of the supplementary notes 17 to 19, wherein the type of the carrier is classified by the transmission configuration of at least any one of a known signal, system information, and a control signal transmitted from the radio station in the carrier.

(Supplementary note 21) The radio terminal described in any one of the supplementary notes 17 to 20, wherein the type of the carrier is classified by contents of the system information.

(Supplementary note 22) The radio terminal described in any one of the supplementary notes 17 to 21, wherein the type of the carrier is classified by a radio transmission scheme.

(Supplementary note 23) The radio terminal described in any one of the supplementary notes 17 to 22, wherein the type of the carrier is classified by a duplex mode.

(Supplementary note 24) The radio terminal described in any one of the supplementary notes 16 to 23, wherein the measurement report criteria include at least one of an offset value related to received quality, a decision threshold related to the received quality, and a trigger period as a trigger of a report of the measurement results.

(Supplementary note 25) The radio terminal described in any one of the supplementary notes 16 to 24, wherein the measurement report criteria are configured as different events in each type of the cell or in each predetermined group of the type of the cell.

(Supplementary note 26) The radio terminal described in any one of the supplementary notes 16 to 25, wherein the measurement report criteria are received from the radio station.

(Supplementary note 27) A radio station including:

a control means that controls a plurality of types of cells by using one radio access technology; and a means that transmits to a radio terminal an instruction related to a report of measurement results based on measurement report criteria according to a type of a cell.

(Supplementary note 28) The radio station described in the supplementary note 27, wherein the measurement report criteria are transmitted to the radio terminal.

(Supplementary note 29) The radio station described in the supplementary note 27 or 28, wherein the type of the cell is identified by a type of a carrier as a component of the cell.

(Supplementary note 30) The radio station described in the supplementary note 29, wherein the type of the carrier is classified by a transmission configuration of a transmitted signal.

(Supplementary note 31) The radio station described in any one of the supplementary notes 27 to 30, wherein a cell of a handover target of the radio terminal is determined based on measurement results reported from the radio terminal.

(Supplementary note 32) The radio station described in the supplementary note 31, wherein a predetermined type of the cell is preferentially determined as the handover target of the radio terminal.

(Supplementary note 33) The radio station described in any one of the supplementary notes 27 to 30, wherein an additional serving cell of the radio terminal is determined based on measurement results reported from the radio terminal.

(Supplementary note 34) The radio station described in the supplementary note 33, wherein the predetermined type of the cell is preferentially determined as the additional serving cell of the radio terminal.

(Supplementary note 35) A communication control method including:

causing at least one radio station to control a plurality of types of cells by using one radio access technology;

causing a radio terminal to recognize a type of a cell; and causing the radio terminal to report measurement results based on measurement report criteria according to the type of the cell.

(Supplementary note 36) The communication control method described in the supplementary note 35, wherein the type of the cell is identified by a type of a carrier as a component of the cell.

(Supplementary note 37) The communication control method described in the supplementary note 36, wherein the type of the carrier is classified by a transmission configuration of a transmitted signal.

(Supplementary note 38) The communication control method described in the supplementary note 36 or 37, wherein the type of the carrier is classified by a configuration of a physical channel.

(Supplementary note 39) The communication control method described in any one of the supplementary notes 36 to 38, wherein the type of the carrier is classified by a transmission configuration of at least any one of a known signal, system information, and a control signal transmitted from the radio station in the carrier.

(Supplementary note 40) The communication control method described in any one of the supplementary notes 36 to 39, wherein the type of the carrier is classified by contents of the system information.

(Supplementary note 41) The communication control method described in any one of the supplementary notes 36 to 40, wherein the type of the carrier is classified by a radio transmission scheme.

(Supplementary note 42) The communication control method described in any one of the supplementary notes 36 to 41, wherein the type of the carrier is classified by a duplex mode.

(Supplementary note 43) The communication control method described in any one of the supplementary notes 35 to 42, wherein the measurement report criteria include at least one of an offset value related to received quality, a decision threshold related to the received quality, and a trigger period as a trigger of a report of the measurement results.

(Supplementary note 44) The communication control method described in any one of the supplementary notes 35 to 43, wherein the measurement report criteria are configured as different events in each type of the cell or in each predetermined group of the type of the cell.

(Supplementary note 45) The communication control method described in any one of the supplementary notes 35 to 44, wherein the radio station transmits the measurement report criteria to the radio terminal.

(Supplementary note 46) The communication control method described in any one of the supplementary notes 35 to 45, wherein the radio station determines a cell of a handover target of the radio terminal based on measurement results reported from the radio terminal.

(Supplementary note 47) The communication control method described in the supplementary note 46, wherein the radio station preferentially determines a predetermined type of the cell as the handover target of the radio terminal.

(Supplementary note 48) The communication control method described in any one of the supplementary notes 35 to 45, wherein the radio station determines an additional serving cell of the radio terminal based on measurement results reported from the radio terminal.

(Supplementary note 49) The communication control method described in the supplementary note 48, wherein the radio station preferentially determines the predetermined type of the cell as the additional serving cell of the radio terminal.

This application is based upon and claims the benefit of priority of the prior Japanese Patent Application No. 2012-151911, filed on Jul. 5, 2012, the entire contents of which are incorporated herein by reference.

REFERENCE SIGNS LIST

1 radio station
2 radio terminal
10 radio signal receiver
11 demodulation unit
12 transmission unit
13 reception unit
14 control unit
15 signal generation unit
16 radio signal transmitter
20 radio signal receiver
21 demodulation unit
22 recognition unit
23 control unit
24 measurement unit
25 signal generation unit
26 radio signal transmitter

The invention claimed is:

1. A radio communication system in which a radio station and a radio terminal communicate with each other, wherein the radio station comprises at least one processor configured to implement a control unit configured to control a plurality of types of cells by using one radio access technology and a memory coupled to the at least one processor; and wherein the radio terminal comprises at least one processor configured to implement a recognition unit configured to recognize a type of a cell that is identified by a type of system information, the system information being broadcasted in each of cells; and a transmitter configured to report measurement results based on measurement report criteria that is different depending on the type of the cell, wherein the system information does not include cell type information.

2. The radio communication system according to claim 1, wherein the measurement report criteria are configured by using different events for each type of the cell or for each predetermined group of the type of the cell.

3. A radio terminal for use in a radio communication system in which a radio station controls a plurality of types of cells by using one radio access technology, comprising:
at least one processor and a memory coupled to the at least one processor,
wherein the at least one processor is configured to recognize a type of a cell that is identified by a type of system information, the system information being broadcasted in each of cells; and
a transmitter configured to report measurement results based on measurement report criteria that is different depending on the type of the cell, wherein the system information does not include cell type information.

4. The radio terminal according to claim 3, wherein the type of the carrier is classified by a transmission configuration of a transmitted signal.

5. The radio terminal according to claim 3, wherein the type of the carrier is classified by a configuration of a physical channel.

6. The radio terminal according to claim 3, wherein the type of the carrier is classified by the transmission configuration of at least any one of a known signal, system information, and a control signal transmitted from the radio station in the carrier.

7. The radio terminal according to claim 3, wherein the type of the carrier is classified by contents of the system information.

8. The radio terminal according to claim 3, wherein the measurement report criteria are configured as different events in each type of the cell or in each predetermined group of the type of the cell.

9. The radio terminal according to claim 3, wherein the measurement report criteria are received from the radio station.

10. A radio station comprising:
at least one processor and a memory coupled to the at least one processor, wherein the at least one processor is configured to
control a plurality of types of cells by using one radio access technology; and
a transmitter configured to transmit to a radio terminal an instruction related to a report of measurement results based on measurement report criteria that is different depending on a type of a cell and system information to recognize the type of cell by the radio terminal, wherein the type of cell is identified by the system information, and
the system information does not include cell type information.

11. The radio station according to claim 10, wherein the measurement report criteria are transmitted to the radio terminal.

12. The radio station according to claim 10, wherein the type of the carrier is classified by a transmission configuration of a transmitted signal.

13. The radio station according to claim 10, wherein a predetermined type of the cell is preferentially determined as the handover target of the radio terminal.

14. The radio station according to claim 10, wherein a predetermined type of the cell is preferentially determined as the additional serving cell of the radio terminal.

15. A communication control method comprising:
causing at least one radio station to control a plurality of types of cells by using one radio access technology;
causing a radio terminal to recognize a type of a cell that is identified by a type of system information, the system information being broadcasted in each of cells; and
causing the radio terminal to report measurement results based on measurement report criteria that is different depending on to the type of the cell, wherein the system information does not include cell type information.

16. The communication control method according to claim 15, wherein
the measurement report criteria are configured as different events in each type of the cell or in each predetermined group of the type of the cell.

* * * * *